US010715960B2

United States Patent
Blaha, Jr. et al.

(10) Patent No.: US 10,715,960 B2
(45) Date of Patent: Jul. 14, 2020

(54) ESTIMATION OF A STACK-EFFECT COMPENSATION MODEL BASED ON MEASUREMENTS PROVIDED BY A WIRELESS TERMINAL

(71) Applicant: Polaris Wireless, Inc., Mountain View, CA (US)

(72) Inventors: Jerome Arthur Blaha, Jr., Redwood City, CA (US); Scot Douglas Gordon, Redmond, CA (US); Jonathan Shiao-en Lu, San Jose, CA (US); Jeffrey Noel Wu, Santa Clara, CA (US); Jian Zhu, Tustin, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 16/152,468

(22) Filed: Oct. 5, 2018

(65) Prior Publication Data

US 2020/0112831 A1 Apr. 9, 2020

(51) Int. Cl.
*H04W 4/02* (2018.01)
*H04W 4/029* (2018.01)

(52) U.S. Cl.
CPC .......... *H04W 4/025* (2013.01); *H04W 4/029* (2018.02)

(58) Field of Classification Search
CPC .............................. H04W 4/025; H04W 4/029
USPC ............................................... 455/456.1–457
See application file for complete search history.

(56) References Cited

U.S. PATENT DOCUMENTS

| | | | |
|---|---|---|---|
| 6,518,918 B1 | 2/2003 | Vannucci et al. | |
| 6,944,465 B2 | 9/2005 | Spain et al. | |
| 7,263,442 B2 | 8/2007 | Eckel | |
| 7,433,695 B2 | 9/2008 | Gordon et al. | |
| 8,938,210 B1 | 1/2015 | Otto et al. | |
| 9,119,165 B2 | 8/2015 | Krasner et al. | |
| 9,237,423 B1 * | 1/2016 | Blaha, Jr. | H04W 4/025 |

(Continued)

OTHER PUBLICATIONS

"Notice of Allowance, issued in parent U.S. Appl. No. 14/472,600", dated Sep. 25, 2015.

(Continued)

*Primary Examiner* — Michael Y Mapa
(74) *Attorney, Agent, or Firm* — McGeary Cukor LLC; Kenneth Ottesen; Jason Paul DeMont

(57) ABSTRACT

A technique for developing a stack-effect compensation model that is representative of a structure, such as a particular building, and of generating an estimate of the elevation of a wireless terminal inside the structure by using the model. The technique includes estimating information related to one or more neutral pressure planes within the structure, at which the difference between the indoor barometric pressure and the outdoor barometric pressure is essentially zero. The technique leverages pressure and temperature measurements that are provided by one or more wireless terminals that are regularly present in the building. The stack-effect compensation model includes a parameter that represents, for each of a plurality of uncompensated elevations, the height of the particular uncompensated elevation above a neutral pressure plane. The location engine uses this height-information parameter from the compensation model, in order to develop the estimate of the elevation of the wireless terminal.

16 Claims, 15 Drawing Sheets

(56) References Cited

U.S. PATENT DOCUMENTS

| | | | |
|---|---|---|---|
| 2005/0272447 | A1 | 12/2005 | Eckel |
| 2010/0099433 | A1 | 4/2010 | Wigren |
| 2012/0290253 | A1 | 11/2012 | Barrett et al. |
| 2013/0035110 | A1 | 2/2013 | Sridhara et al. |
| 2013/0217410 | A1 | 8/2013 | Ku et al. |
| 2014/0135040 | A1 | 5/2014 | Edge et al. |
| 2014/0274151 | A1 | 9/2014 | Pattabiraman et al. |
| 2015/0133145 | A1 | 5/2015 | Palanki et al. |
| 2015/0233713 | A1 | 8/2015 | Wolf |
| 2017/0223509 | A1* | 8/2017 | Han .................. F24F 11/62 |

OTHER PUBLICATIONS

Andy Walker, "Natural Ventilation", "WBDG Whole Building Design Guide", Jun. 15, 2010, Publisher: National Institute of Building Sciences (2014), Published in: US.

"The Stack Effect: When Buildings Act Like Chimneys", "Green Building Advisor (http://www.greenbuildingadvisor.com)", 2013, Publisher: The Taunton Press, Inc., Published in: US.

Office action issued in U.S. Appl. No. 14/960,577, dated May 20, 2016.

CMHUI@HKU.HK, "Lecture: Air Movement and Natural Ventilation", Aug. 17, 2001, Publisher: The University of Hong Kong / Department of Agriculture (http://www.arch.hku.hk/), Published in: HK.

"Definition of 'Stack Effect'", "http://en.wikipedia.org/w/index.php?title=Stack_effect&oldid=601932011", , Publisher: Wikipedia, the free encyclopedia, Published in: US.

"Definition of 'Solar updraft tower'", "http://en.wikipedia.org/w/index.php?title=Solar_updraft_tower&oldid=612364746", , Publisher: Wikipedia, the free encyclopedia, Published in: US.

"Notice of Allowance" dated Jul. 8, 2016 in related U.S. Appl. No. 14/472,574.

Office action issued in U.S. Appl. No. 14/960,577, dated Feb. 2, 2016.

\* cited by examiner

ESTIMATION OF A STACK-EFFECT COMPENSATION MODEL BASED ON MEASUREMENTS PROVIDED BY A WIRELESS TERMINAL

FIELD OF THE INVENTION

The present invention relates to telecommunications in general and, more particularly, to a technique for estimating a stack-effect compensation model representative of a structure, such as a building, and estimating the elevation of a wireless terminal within the structure based on the estimated compensation model.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

There are also techniques in the prior art for estimating the elevation of a wireless terminal. Some of these techniques rely on the relationship between barometric pressure, $P_A$, and elevation, $Z_A$, in which $P_A$ decreases logarithmically with $Z_A$, according to the formula:

$$Z_A = -H_S \ln\left(\frac{P_A}{P_0}\right) \quad \text{(Eq. 1)}$$

wherein
$P_0$ is the reference atmospheric pressure, and
$H_S$ is the scale height of the atmosphere, which is the elevation at which the atmospheric pressure has decreased to $e^{-1}$ times its value at mean sea level (e.g., approximately 8400 meters).

Scale height is well known in the art and is a function of, among other factors, the temperature of the air.

It is well known in the art how to estimate the elevation of an object—such as an airplane—using Equation 1. Aircraft altimeters have used this technique for decades, and it is well known to be highly accurate. Furthermore, it is well known in the art how to estimate the elevation of a wireless terminal using Equation 1, in which barometric pressure measurements made by the wireless terminal can be used.

Estimates of elevation based on barometric pressure, however, can be inaccurate for a variety of reasons. One reason is related to a phenomenon known as the "stack effect." The stack effect relates to the movement of air into, within, and out of structures. This movement of air results in part from air buoyancy, which can occur from a difference in temperature between inside the structure and outside. The greater the difference in temperature, the greater the buoyancy force and the greater the stack effect, at least at certain elevations within the structure. In general, the stack effect is common in tall buildings and other structures.

The stack effect can cause the scale height inside of a structure to be different from the scale height outside. This is mainly because scale height is dependent upon air temperature, and the inside and outside air temperatures are often significantly different from each other. As can be seen in Equation 1, an incorrect value of the scale height $H_S$ can result in an inaccurate estimate of elevation.

SUMMARY OF THE INVENTION

The stack effect can be troublesome when barometric pressure measurements reported by a wireless terminal are used to determine an estimate of the elevation of the wireless terminal within a structure, such as a building. For example, a building might be wholly or partially sealed so that air pressure between the inside and the outside of the building cannot equalize at every elevation. In such a structure, a temperature difference between the inside and the outside of the building can cause the relationship between elevation and the barometric pressure inside of the building to be different than the predicted relationship when based solely on outside temperature. This potentially results in errors in the estimation of elevation inside the building.

In estimating a wireless terminal's elevation within a structure, the stack effect can be considered provided that a stack-effect compensation model is available that is representative of the structure. The problem, however, is that such a compensation model is often unavailable and, consequently, the estimate of elevation can be erroneous by many meters of distance. This is particularly unacceptable, for example, in emergency situations in which the elevation of a person needing to be located—and, by association, the elevation of the person's wireless terminal—must be resolved to a particular building floor.

The present invention enables the developing of a stack-effect compensation model that is representative of a structure, such as a particular building, and the estimating of the elevation of a wireless terminal within the structure based on the estimated model. The inventors recognized that an important component of any stack-effect compensation model is the height of the "neutral pressure plane," also known as the "neutral pressure level," at which the difference between the indoor barometric pressure and the outdoor barometric pressure is essentially zero. A neutral pressure plane can exist even when the inside and outside temperatures are different from each other.

The neutral pressure plane (NPP) is significant, in that once it is known, the difference between i) indoor barometric pressure, which is provided by one or more wireless terminals within a structure, and ii) outdoor barometric pressure, which is provided by a reference station, can be accounted for. This enables a corrected estimate of elevation. Furthermore, by identifying whether additional NPPs exist within the structure, and their heights within the structure, the stack-effect compensation model of the structure can be further refined. The model can be subsequently used for more accurate estimation of the elevations of one or more wireless terminals within the structure.

In accordance with the illustrative embodiment, a location engine disclosed herein embodies the foregoing concepts. The location engine of the illustrative embodiment monitors the variation in the estimates of elevation of a particular wireless terminal at different times, such as on different days. It does so in order to determine the distance of a regularly-visited elevation of the particular wireless terminal to the neutral pressure plane that affects the terminal's pressure measurements. For example, a wireless terminal of a person who works on a particular floor in a particular building is observed to be on that building floor daily. Accordingly, the coincident indoor pressure and temperature measurements provided by the wireless terminal in the example, along with coincident measurements provided by an outdoor reference station, can be used to characterize the variation of the uncompensated estimates of elevation with respect to the neutral pressure plane for that wireless terminal. Additionally, the location engine monitors other wireless terminals that regularly appear within the building as well; in this way, the location engine uses crowdsourced information from multiple wireless terminals to further develop the stack-effect compensation model.

The stack-effect compensation model itself includes a parameter that represents, for each of a plurality of uncompensated elevations, the height of the particular uncompensated elevation above an NPP. The location engine uses this height-information parameter from the compensation model, in order to develop an estimate of the elevation of a wireless terminal. The location engine first generates an uncompensated estimate of elevation that is uncompensated for indoor temperature and then applies the parameter value to the uncompensated estimate in accordance with the techniques disclosed herein, thereby generating a refined estimate of elevation. The wireless terminal whose elevation is being estimated can be a regularly-appearing terminal whose measurements are used by the location engine to develop the compensation model, or a different wireless terminal entirely, or both.

A first illustrative method of estimating elevation of one or more wireless terminals, comprises: receiving, at a data processing system, a first measurement of barometric pressure at a first wireless terminal; receiving, at the data processing system, a first measurement of barometric pressure at an outdoor location; generating a first estimate of the elevation of the first wireless terminal based on: (i) the first measurement of barometric pressure at the first wireless terminal, and (ii) the first measurement of barometric pressure at the outdoor location; generating a stack-effect compensation model for a structure within which the first wireless terminal is located, wherein the stack-effect compensation model is based on the first estimate and a second estimate of the elevation of the first wireless terminal, wherein the second estimate of the elevation of the first wireless terminal is based on a second measurement of barometric pressure at the first wireless terminal, and wherein first and second measurements of barometric pressure at the first wireless terminal are composed of disjoint sets of pressure samples; and generating an estimate of the elevation of a second wireless terminal within the structure based on: (i) a measurement of barometric pressure at the second wireless terminal, and (ii) the stack-effect compensation model.

A second illustrative method of estimating elevation of one or more wireless terminals, comprises: receiving, at a data processing system, a plurality of measurements of barometric pressure at the first wireless terminal; receiving, at the data processing system, a plurality of measurements of temperature at the first wireless terminal; receiving, at the data processing system, a plurality of measurements of temperature at an outdoor location; generating a plurality of estimates of the elevation of the first wireless terminal based on the plurality of measurements of barometric pressure at the first wireless terminal; generating an estimate of height in relation to a neutral pressure plane with a structure, wherein the estimate of the height in relation to the neutral pressure plane is based on: (i) the plurality of measurements of temperature at the first wireless terminal, (ii) the plurality of measurements of temperature at the outdoor location, and (iii) the plurality of estimates of the elevation of the first wireless terminal; and generating an estimate of the elevation of a second wireless terminal with the structure based on: (i) a measurement of barometric pressure at the second wireless terminal, and (ii) the estimate of the height in relation to the neutral pressure plane.

A third illustrative method of estimating elevation of one or more wireless terminals, comprises: receiving, at a data processing system, a plurality of measurements of barometric pressure at a first wireless terminal; receiving, at the data processing system, a plurality of measurements of barometric pressure at a second wireless terminal; receiving, at the data processing system, a plurality of measurements of temperature at the first wireless terminal; receiving, at the data processing system, a plurality of measurements of temperature at the outdoor location; generating a first plurality of estimates of the elevation of the first wireless terminal based on the plurality of measurements of barometric pressure at the first wireless terminal; generating a second plurality of estimates of the elevation of the second wireless terminal based on the plurality of measurements of barometric pressure at the second wireless terminal; generating an estimate of height in relation to a neutral pressure plane within a structure, wherein the estimate of the height in relation to the neutral pressure plane is based on: (i) the plurality of measurements of temperature at the first wireless terminal, (ii) the plurality of measurements of temperature at the outdoor location, (iii) the first plurality of estimates of the elevation of the first wireless terminal, and (iv) the second plurality of estimates of the elevation of the second wireless terminal; and generating an estimate of the elevation of a third wireless terminal within the structure based on: (i) a measurement of barometric pressure at the third wireless terminal, and (ii) the estimate of the height in relation to the neutral pressure plane.

DEFINITIONS

Figure 1:
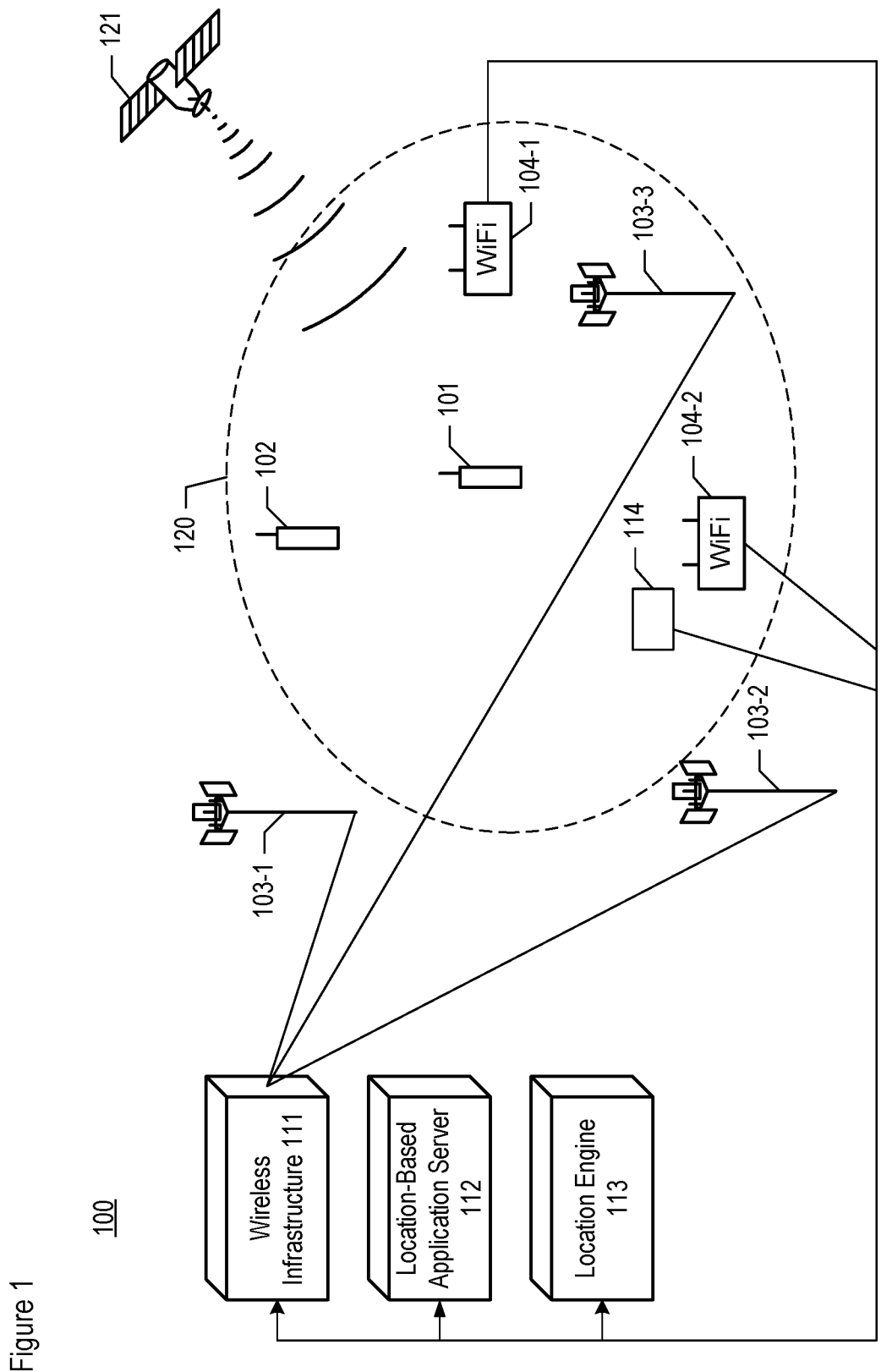
FIG. 1 depicts a diagram of the salient components of wireless telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Elevation—For the purposes of this specification, the term "elevation" is defined as the height relative to a reference (e.g., mean sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Location-Dependent Trait of a Radio Signal—For the purposes of this specification, the term "location-dependent trait of a radio signal" is defined as a characteristic of a radio signal that varies with:

(i) the location of the transmitter of the signal, or
(ii) the location of the receiver of the signal, or
(iii) both i and ii.

For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:

(i) one or more location-dependent traits of one or more radio signals received or transmitted by a wireless terminal, or
(ii) the identity of one or more radio signals received or transmitted by a wireless terminal, or
(iii) both i and ii, at each of a plurality of locations.

Processor—For the purposes of this specification, a "processor" is defined as hardware or hardware and software that performs mathematical and/or logical operations.

Structure—For the purposes of this specification, a "structure" is defined as a building or other object constructed from several parts.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT) device, a computer, and any other type of device capable of operating in a wireless environment are examples of wireless terminals.

DETAILED DESCRIPTION

Wireless Telecommunications System 100—FIG. 1 depicts a diagram of the salient components of wireless telecommunications system 100 in accordance with the illustrative embodiment of the present invention. Wireless telecommunications system 100 comprises: wireless terminals 101 and 102, cellular base stations 103-1, 103-2, and 103-3, Wi-Fi base stations 104-1 and 104-2, wireless infrastructure 111, location-based application server 112, location engine 113, reference station 114, and a Global Navigation Satellite System (GNSS) that includes Global Positioning System (GPS) constellation 121, interrelated as shown.

Wireless infrastructure 111, location-based application server 112, location engine 113 (hereinafter "location engine 113"), and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminals 101 and 102 are devices that provide bi-directional voice, data, and video telecommunications services to their respective users (not shown). Terminals 101 and 102 also perform the processes described below and in the accompanying figures, including measuring temperature and barometric pressure, and providing temperature and pressure measurements. Terminals 101 and 102 comprise the hardware and software necessary to do the aforementioned tasks. Furthermore, wireless terminals 101 and 102 are mobile and can be at any location within geographic region 120 at any time.

Wireless terminals 101 and 102 provide the aforementioned telecommunications services to their respective users and perform the aforementioned tasks. It will, however, be clear to those skilled in the art, after reading this disclosure, how to make and use embodiments of the present invention in which wireless terminals 101 and 102 provide a different set of services or perform a different set of tasks.

In accordance with the illustrative embodiment, wireless terminals 101 and 102 can receive one or more radio signals from each of base stations 103-1, 103-2, and 103-3, Wi-Fi base stations 104-1 and 104-2, and GPS constellation 121, in well-known fashion. Wireless terminals 101 and 102 are also capable of identifying each radio signal it receives, in well-known fashion, and of transmitting the identity of each signal it receives to location engine 113. The wireless terminals are further capable of measuring one or more location-dependent traits of each radio signal they receive, in well-known fashion, and of transmitting each measurement they generate to location engine 113. And the wireless terminals also can measure a difference of a location-dependent trait of two signals they each receive, in well-known fashion, and of transmitting such measurements to location engine 113. As those who are skilled in the art will appreciate after reading this specification, wireless terminals 101 and 102 can use technologies other than WiFi and GPS for location purposes in some other embodiments of the present invention.

In accordance with the illustrative embodiment, wireless terminals 101 and 102 can transmit one or more radio signals—that can be received by one or more of base stations 103-1, 103-2, and 103-3 and Wi-Fi base stations 104-1 and 104-2—in accordance with specific parameters (e.g., MAC address, signal strength, frequency, coding, modulation, band, etc.), in well-known fashion, and of transmitting those parameters to location engine 113.

In accordance with the illustrative embodiment, and as described in detail below, wireless terminals 101 and 102 each comprise a barometer (shown in FIG. 2 as barometer 205). Accordingly, wireless terminals 101 and 102 are capable of measuring (e.g., periodically, sporadically, and on-demand) the temperature and barometric pressure, in well-known fashion, and of transmitting the measurements to location engine 113.

Although the illustrative embodiment depicts wireless telecommunications system 100 as comprising two wireless terminals, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline or wireless backhaul and with wireless terminals 101 and 102 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

a. receiving one or more radio signals transmitted by wireless terminals 101 and 102, and b. identifying each radio signal transmitted by wireless terminals 101 and 102, in well-known fashion, and of transmitting the identity of those signals to location engine 113, and c. measuring one or more location-dependent traits of each radio signal transmitted by wireless terminals 101 and 102, in well-known fashion, and of transmitting the measurements to location engine 113, and d. transmitting one or more signals to wireless terminals 101 and 102 in accordance with specific parameters (e.g., signal strength, frequency, coding, modulation, etc.), in well-known fashion, and of transmitting those parameters to location engine 113, and e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminals 101 and 102 via radio in well-known fashion and in accordance with a WiFi protocol. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:
   a. receiving one or more radio signals transmitted by wireless terminals 101 and 102, and
   b. identifying each radio signal transmitted by wireless terminals 101 and 102, in well-known fashion, and of transmitting the identity of those signals to location engine 113, and
   c. measuring one or more location-dependent traits of each radio signal transmitted by wireless terminals 101 and 102, in well-known fashion, and of transmitting the measurements to location engine 113, and
   d. transmitting one or more signals to wireless terminals 101 and 102 in accordance with specific parameters (e.g., signal strength, frequency, coding, modulation, etc.), in well-known fashion, and of transmitting those parameters to location engine 113, and
   e. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminals 101 and 102 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminals 101 and 102—generated by location engine 113—in a location-based application, in well-known fashion. Location-based applications are well-known in the art and provide services such as without limitation E-911 routing, navigation, location-based advertising, weather alerts. In accordance with the illustrative embodiment, location-based application server 112 is implemented on a data-processing system made up of one or more server computers.

Figure 3:
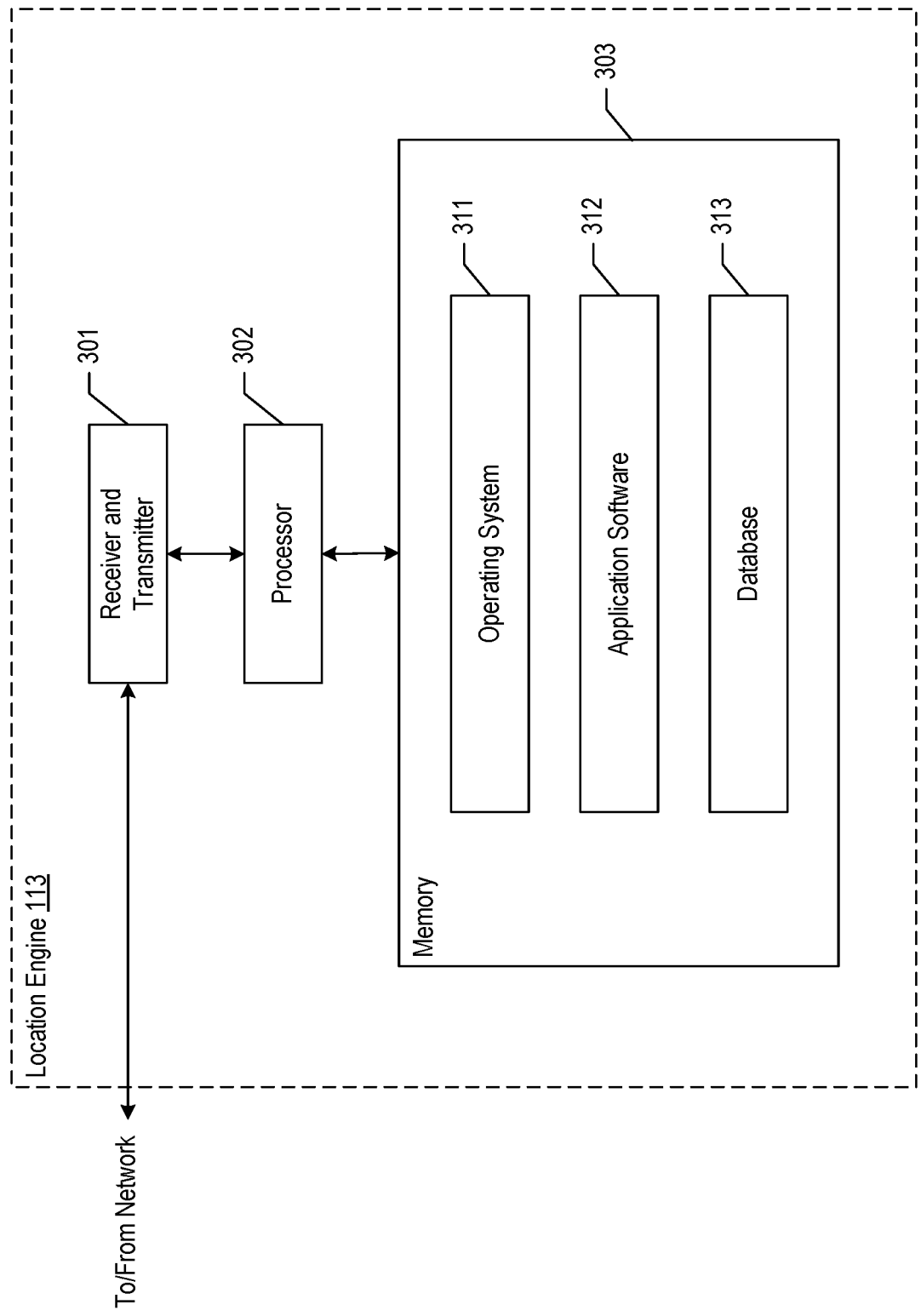
FIG. 3 depicts a block diagram of the salient components of location engine 113 of telecommunications system 100.

Location engine 113 is a data processing system that comprises hardware and software that generates one or more estimates of the locations of wireless terminals 101 and 102 as described below and in the accompanying figures. Location engine 113 is further capable of providing the building morphology estimation (e.g., neutral pressure plane estimation, etc.) as disclosed herein. In accordance with the illustrative embodiment, location engine 113 is implemented on a data-processing system made up of one or more server computers. It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111. Location engine 113 comprises the location-trait database and geographic information system (GIS) databases, which are described in detail below.

Reference station 114 comprises hardware and software that continually measures the outdoor temperature (i.e., provides a measurement of temperature representative of an outdoor location) and measures the atmospheric pressure (i.e., provides a measurement of barometric pressure representative of an outdoor location), in well-known fashion, and transmits those measurements to location engine 113. In some embodiments of the present invention, station 114 measures the humidity of the outdoor air and transmits those measurements to location engine 113. Reference station 114 is at a known location in geographic region and known elevation, and measures temperature and barometric pressure at an outdoor location, thereby not being subject to any stack effect. In some embodiments of the present invention, station 114 provides measurements of temperature and/or barometric pressure representative of a known outdoor location by taking the measurements at a well-ventilated indoor location (e.g., a ventilated shelter, etc.), or by taking pressure measurements at an indoor location at which the pressure is equal to the outdoor pressure at the same elevation.

In some embodiments of the present invention, reference station 114 is at a weather-reporting station, while in other embodiments reference 114 is at an airport station, while in still other embodiments reference 114 is at a different type of station (i.e., neither at an airport nor reporting the weather). Although the illustrative embodiment comprises only one reference station, it will be clear to those skilled in the art how to make and use alternative embodiments of the present invention that comprise any number of reference stations.

Figure 2:
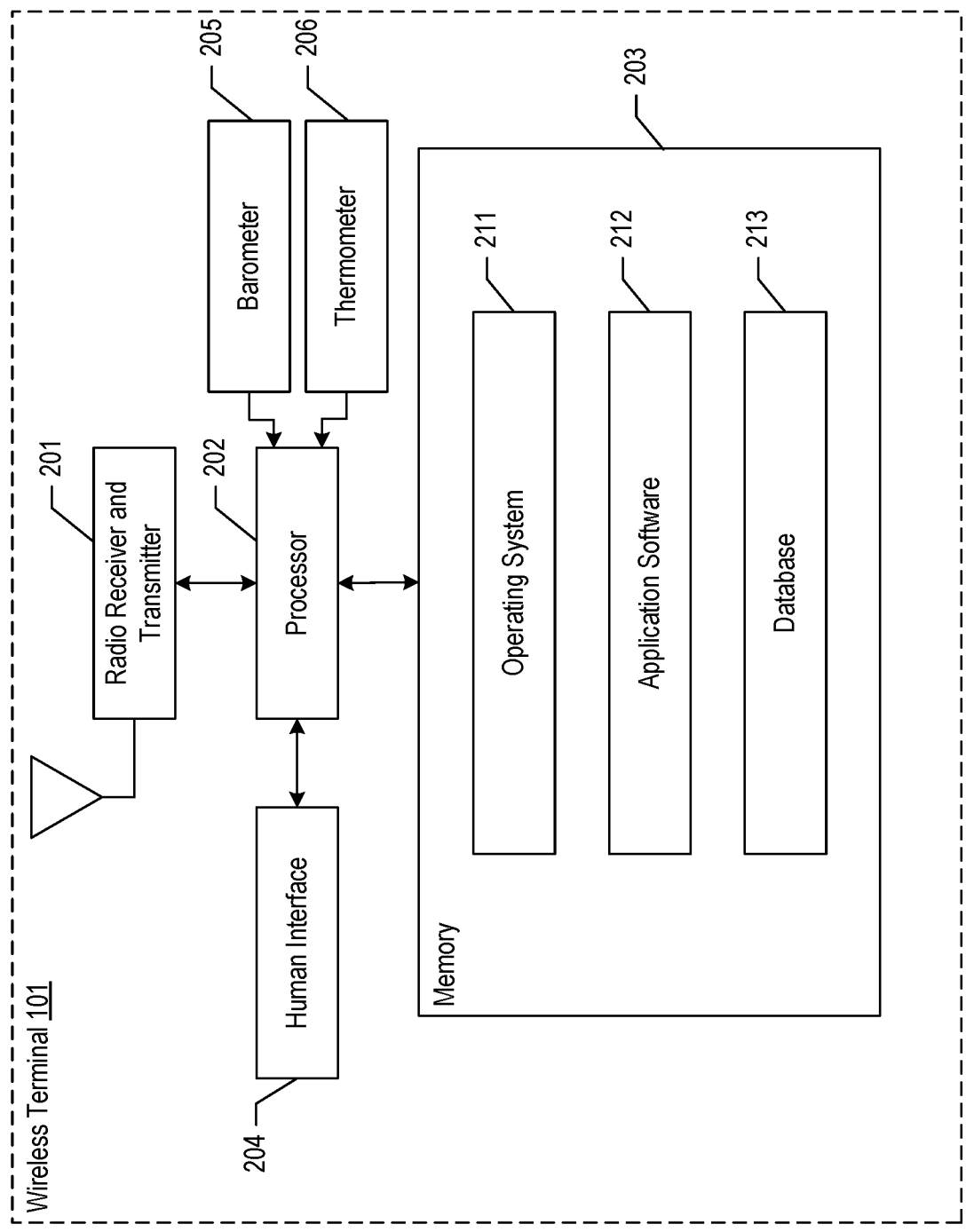
FIG. 2 depicts a block diagram of the salient components of wireless terminal 101 of telecommunications system 100.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, human interface 204, and barometer 205, interconnected as shown. The block diagram depicted in FIG. 2 can also be considered representative of wireless terminal 102 and other wireless terminals.

Radio receiver and transmitter 201 comprises hardware and software that enables wireless terminal 101 to receive (and analyze) radio signals and to transmit radio signals. In accordance with the illustrative embodiment, wireless telecommunications service is provided to wireless terminal 101 in accordance with both the Long-Term Evolution (LTE) 4G air-interface standard of the $3^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

Human interface 204 is hardware and software that enables a person to interact with wireless terminal 101. Human interface 204 comprises a display, keypad, microphone, and speaker. It will be clear to those skilled in the art how to make and use human interface 204.

Barometer 205 is a barometric sensor device and typically comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

Thermometer 206 is a hardware temperature sensor that measures the ambient temperature at wireless terminal 101. In accordance with the illustrative embodiment, thermometer 206 comprises the Bosch BMP280 sensor, which also measures temperature in addition to pressure, but it will be clear to those skilled in the art, after reading this disclosure, how to make and use alternative embodiments of the present invention that use a different sensor to measure the ambient temperature at wireless terminal 101. For example, the ADT7420 temperature sensor from Analog Devices is capable of measuring temperature. In some embodiments of the present invention, wireless terminal 101 has no thermometer, in which case the system disclosed herein can determine indoor temperature through other means as described below.

As those who are skilled in the art will appreciate, wireless terminal 101 can be equipped with one or more sensors that can measure humidity in the environment.

Wireless terminal 101 can perform at least some of the processes described below and in the accompanying figures. For example and without limitation, wireless terminal 101 is capable of:
  a. receiving one or more radio signals transmitted by cellular base stations 103-1, 103-2, and 103-3, Wi-Fi base stations 104-1 and 104-2, and GPS constellation 121, and
  b. identifying each radio signal transmitted by cellular base stations 103-1, 103-2, and 103-3, Wi-Fi base stations 104-1 and 104-2, and GPS constellation 121, in well-known fashion, and of transmitting the identity of those signals, or information related to the identity of those signals, to location engine 113, and
  c. measuring one or more location-dependent traits of each radio signal transmitted by cellular base stations 103-1, 103-2, and 103-3, Wi-Fi base stations 104-1 and 104-2, and GPS constellation 121, in well-known fashion, and of transmitting the measurements to location engine 113, and
  d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113, and
  e. measuring the temperature and barometric pressure at wireless terminal 101, in well-known fashion, and transmitting those measurements to location engine 113. In some embodiments of the present invention, wireless terminal can measure the temperature and/or humidity at wireless terminal 101, in well-known fashion, and transmit those measurements to location engine 113.

It will be clear to those skilled in the art how to make and use wireless terminal 101 and, by extension, wireless terminal 102.

Location engine 113—FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enables location engine 113 to transmit to and receive from wireless terminals 101 and 102, wireless infrastructure 111, location-based application server 112, reference station 114, and Wi-Fi base stations 104-1 and 104-2, in well-known fashion. It will be clear to those skilled in the art how to make and use receiver and transmitter 301.

Processor 302 is a general-purpose processor that can execute an operating system, the application software that performs operations 401 through 413 (described herein and shown in FIG. 4), and of populating, amending, using, and managing a location-trait database and a GIS database, as described in detail below and in the accompanying figures. It will be clear to those skilled in the art how to make and use processor 302.

In general, the location-trait database contains information for the possible locations of a wireless terminal and the identity and location-dependent traits of radio signals as if the wireless terminal were at each of those locations. It will be clear to those skilled in the art how to make and use the location-trait database.

In general, the GIS database contains information for geographic region 120, including without limitation, the physical characteristics of all of the structures in geographic region 120. It will be clear to those skilled in the art how to make and use the GIS database.

Memory 303 is a non-transitory, non-volatile memory that stores:
  a. operating system 311, and
  b. application software 312, and
  c. the location-trait database in database 313, and
  d. the GIS database in database 313.

In some embodiments of the present invention, memory 303 is in the form of cloud storage or network storage. In any event, it will be clear to those skilled in the art how to make and use memory 303.

Figure 4:
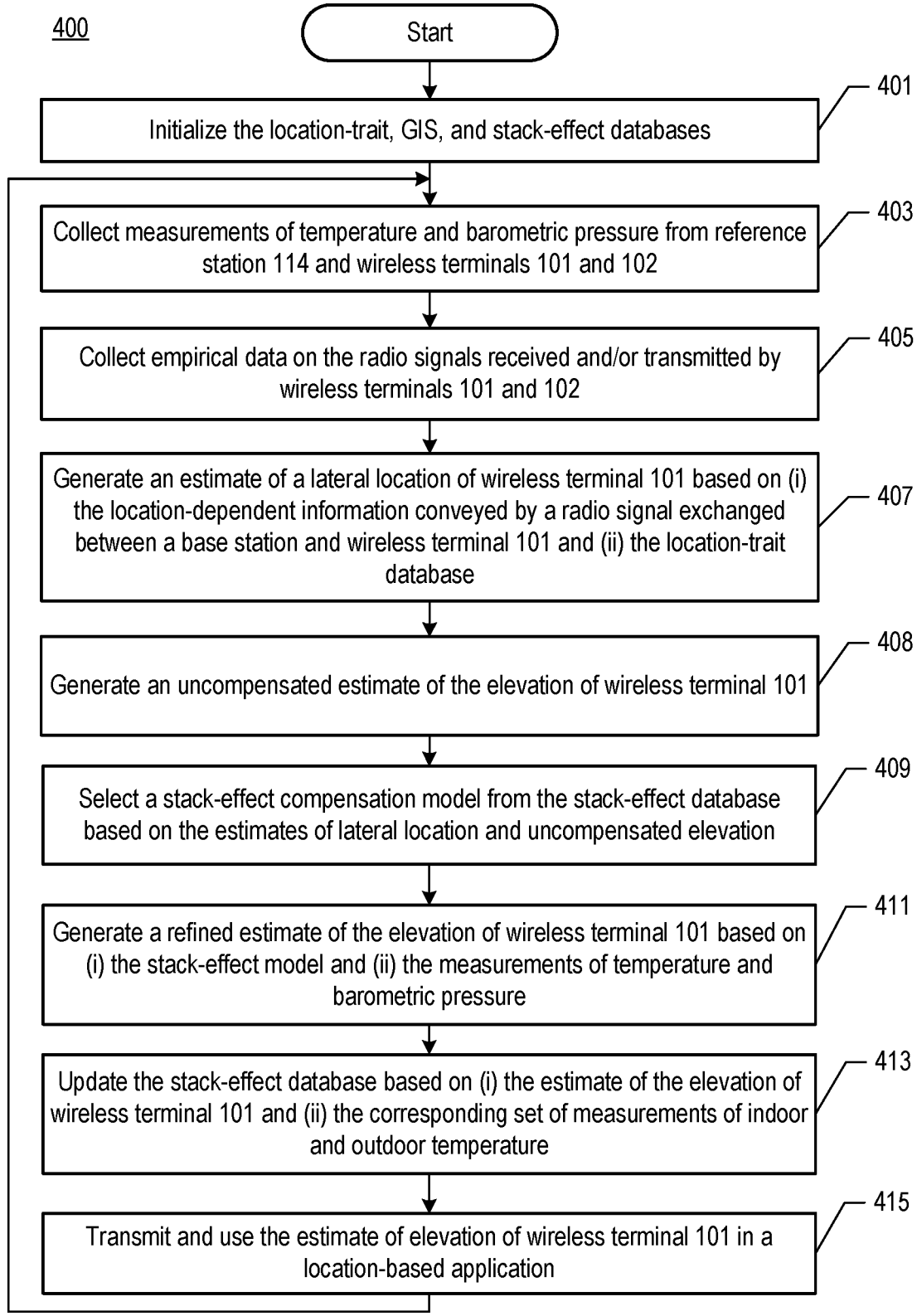
FIG. 4 depicts a flowchart of the salient processes performed as part of method 400 in accordance with the illustrative embodiment of the present invention.

Operation of the Illustrative Embodiment—FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, etc.).

In accordance with operation 401, the location-trait database, GIS database, and stack-effect database are initialized and stored in memory 303 of location engine 113. Operation 401 is described in detail below and in the accompanying figures.

In accordance with operation 403, location engine 113 collects measurements of temperature and barometric pressure from wireless terminals 101 and 102, and from reference station 114. In some embodiments of the present invention, location engine 113 can also collect measurements of temperature and/or humidity. Operation 403 is described in detail below and in the accompanying figures.

In accordance with operation 405, location engine 113 collects empirical data on the radio signals received and transmitted by wireless terminals 101 and 102. Operation 405 is described in detail below and in the accompanying figures.

Figure 8:
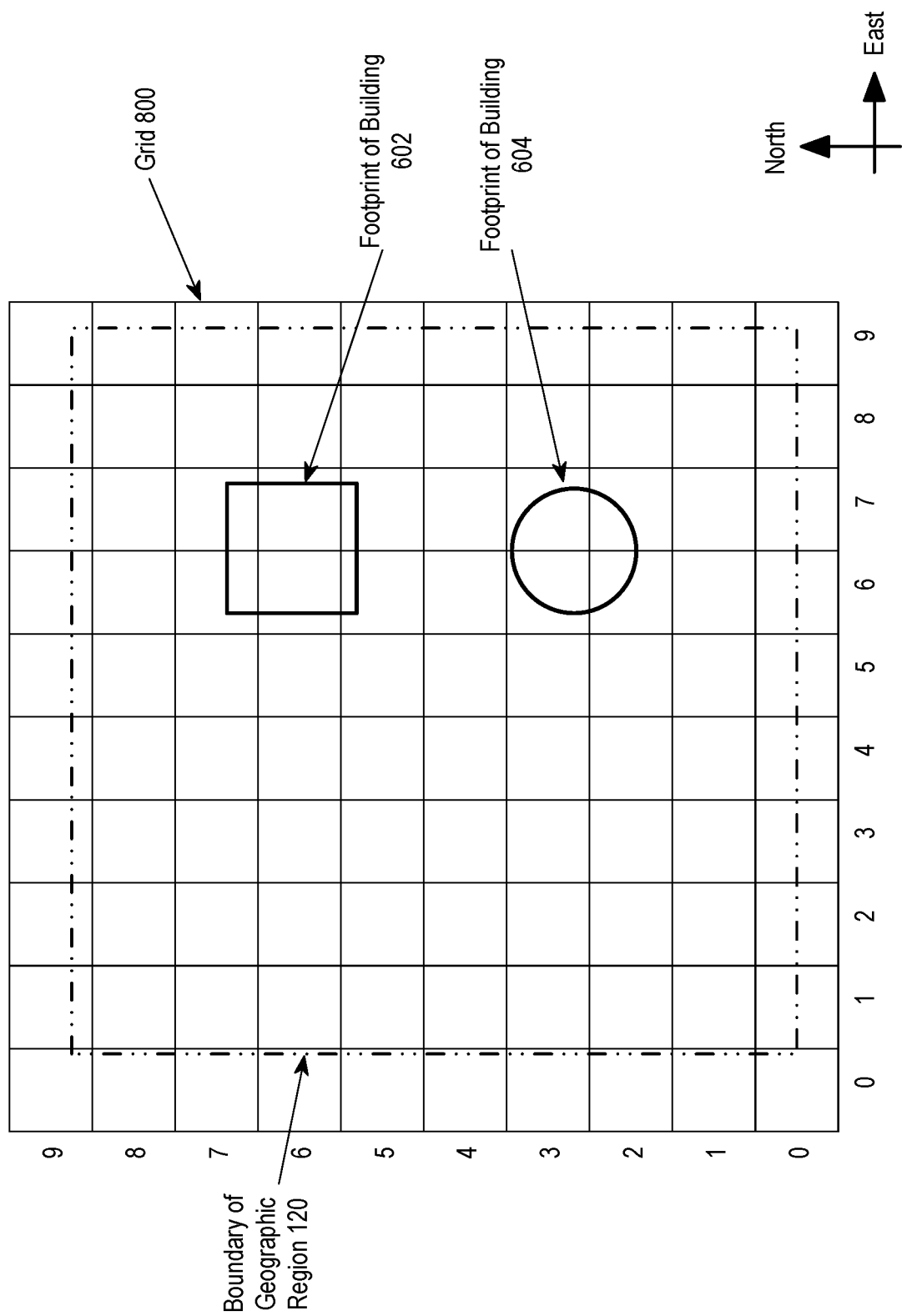
FIG. 8 depicts geographic region 120 divided into a 10-by-10 grid.

In accordance with operation 407, location engine 113 generates an estimate of the lateral location of wireless terminal 101 based on:
  (i) the location-dependent information conveyed by a radio signal exchanged between a base station (e.g., cellular base station 103-i, Wi-Fi base station 104-j, etc.) and wireless terminal 101 (e.g., the empirical data for the radio signals received in operation 407, etc.), and
  (ii) the location-trait database,
in well-known fashion. It will be clear to those skilled in the art how to make and use embodiments of the present invention to perform operation 407. See for example and without limitation, U.S. Pat. Nos. 6,944,465, 7460,505, 7,383,051, 7,257,414, 7,753,278, 7,433,695, 7,848,762, and 8,630,665, each of which are incorporated by reference. In accordance with the illustrative embodiment of the present invention, the estimate of the lateral location of wireless terminal 101 is one grid square in geographic region 120 (as depicted in FIG. 8).

As those who are skilled in the art will appreciate after reading this specification, in some alternative embodiments the lateral location can be determined using a different technique than RF pattern matching (e.g., Global Navigation Satellite System [GNSS], GPS, WiFi, Bluetooth, OTDOA, etc.) that is based on a measurement of a location-dependent trait (e.g., signal strength, timing, etc.) of a radio signal and/or is based on the identity (e.g., cell ID, SSID, etc.) of a radio signal. Moreover, as those who are skilled in the art will appreciate after reading this specification, more than one technique can be combined in order to determine the lateral location, in some embodiments of the present invention.

In accordance with operation 408, location engine 113 generates an uncompensated estimate of elevation of wireless terminal 101. Operation 408 is described in detail below and in the accompanying figures.

In accordance with operation 409, location engine 113 selects the stack-effect compensation model from the stack-effect database that corresponds to the estimate of the lateral location of wireless terminal 101 generated in operation 407 and the uncompensated estimate of the elevation of wireless terminal 101 generated in operation 408. For example, if wireless terminal 101 is estimated to be both (i) in grid square (6,3), which corresponds to building 604, and (ii) at an elevation of 1067 meters as the uncompensated estimate, then the stack-effect compensation model associated with the combination of grid square (6,3) and 1067 meters is selected. The rationale here is that the uncompensated estimate of the elevation of wireless terminal 101, determined in accordance with operation 408, is close enough to be able to access the applicable stack-effect model parameter, which location engine 113 can then use for refining the estimate of elevation in accordance with operation 411.

In some embodiments of the present invention, location engine 113 selects the stack-effect compensation model based on prior knowledge of local building code information, either in addition to or instead of consideration of the lateral location and/or uncompensated elevation of the wireless terminal. In any event, it will be clear to those skilled in the art, after reading this disclosure, how to make and use embodiments of the present invention that perform operation 409.

In accordance with operation 411, location engine 113 generates a refined estimate of the elevation of wireless terminal 101 based on:
  (i) the stack-effect compensation model selected in operation 409, and
  (ii) the measurements of temperature and barometric pressure received in operation 403.
Operation 411 is described in detail below and in the accompanying figures.

In accordance with operation 413, location engine 113 updates the stack-effect compensation model in the database, based on:
  (i) the refined estimate of the elevation of wireless terminal 101, as generated in operation 411, and
  (ii) the set of measurements of temperature and barometric pressure received in operation 403 on which the estimate of elevation is based.
Operation 413 is described in detail below and in the accompanying figures.

In accordance with operation 415, location engine 113 transmits:
  (i) the estimate of the lateral location of wireless terminal 101 generated in accordance with operation 407, and/or
  (ii) the uncompensated estimate of the elevation of wireless terminal 101 generated in accordance with operation 408, and/or
  (iii) the refined estimate of the elevation of wireless terminal 101 generated in accordance with operation 411, and/or
  (iv) information from the stack-effect compensation model updated in accordance with operation 413, and/or
  (v) any other information used to determine the lateral location, estimate of elevation, and/or stack-effect compensation model,
to location-based application server 112 and/or to wireless terminal 101 and/or 102 for use in a location-based application and/or to yet another data-processing system (e.g., server computer, wireless terminal, etc.). In some embodiments of the present invention, location engine 113 transmits the estimate of the height of one or more neutral pressure planes generated in accordance with operation 413.

In some embodiments of the present invention, location engine 113 displays (e.g., on a display, etc.) information related to the neutral pressure plane, other information related to the stack-effect compensation model, estimate of lateral location and/or estimate of elevation, instead of or in addition to transmitting them. In any event, it will be clear to those skilled in the art how to make and use embodiments of the present invention that perform operation 415.

After operation 415 is completed, control passes back to operation 403.

Figure 5:
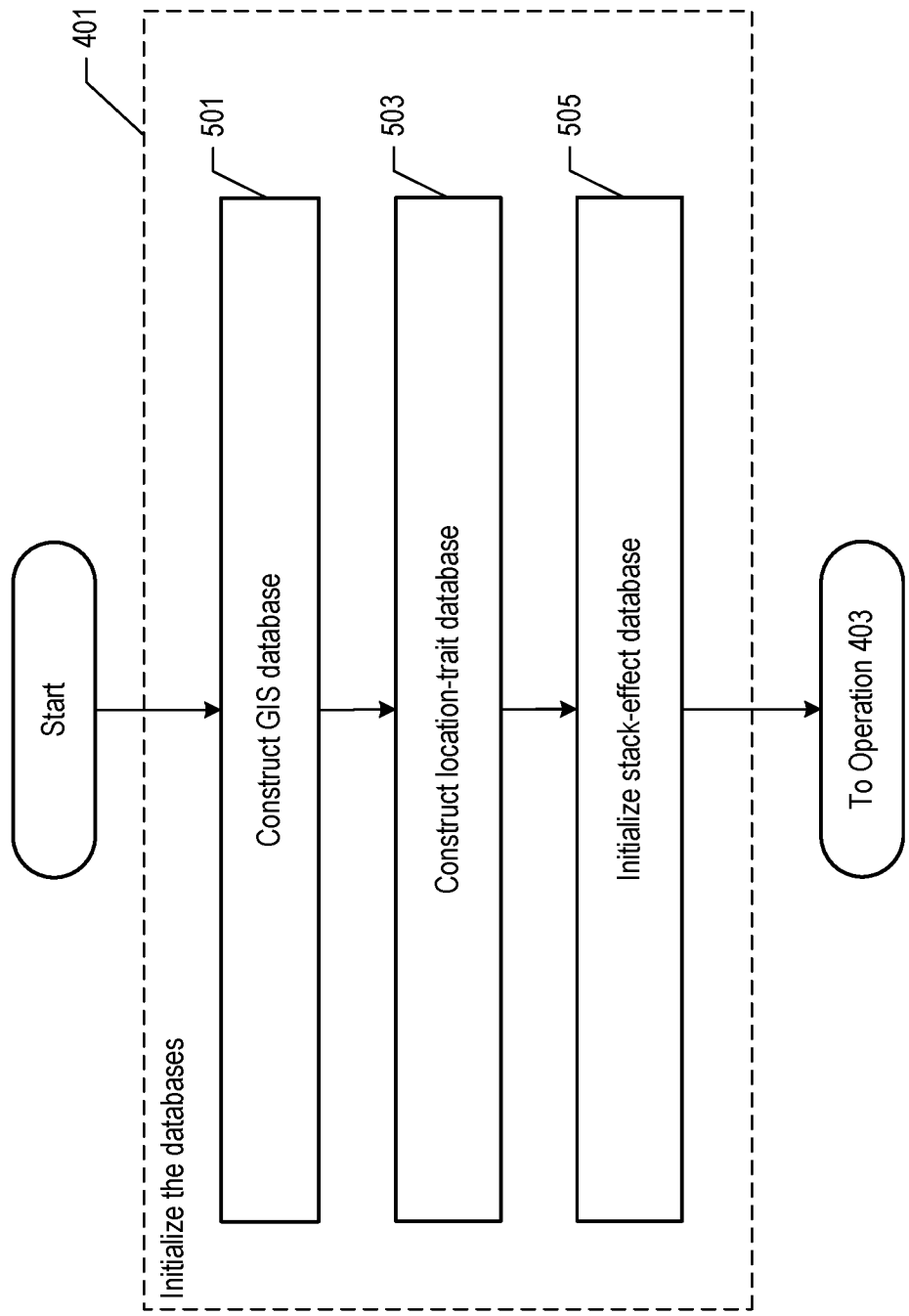
FIG. 5 depicts a flowchart of the salient processes performed in accordance with operation 401 of method 400.

Operation 401: Construct the GIS Database and the Location-Trait Database—FIG. 5 depicts a flowchart of the salient processes performed in accordance with operation 401. It will be clear to those skilled in the art that operations 501, 503, and 505 can be performed concurrently or in any order.

At operation 501, the GIS database is constructed and stored in memory 303 of location engine 113.

Figure 6:
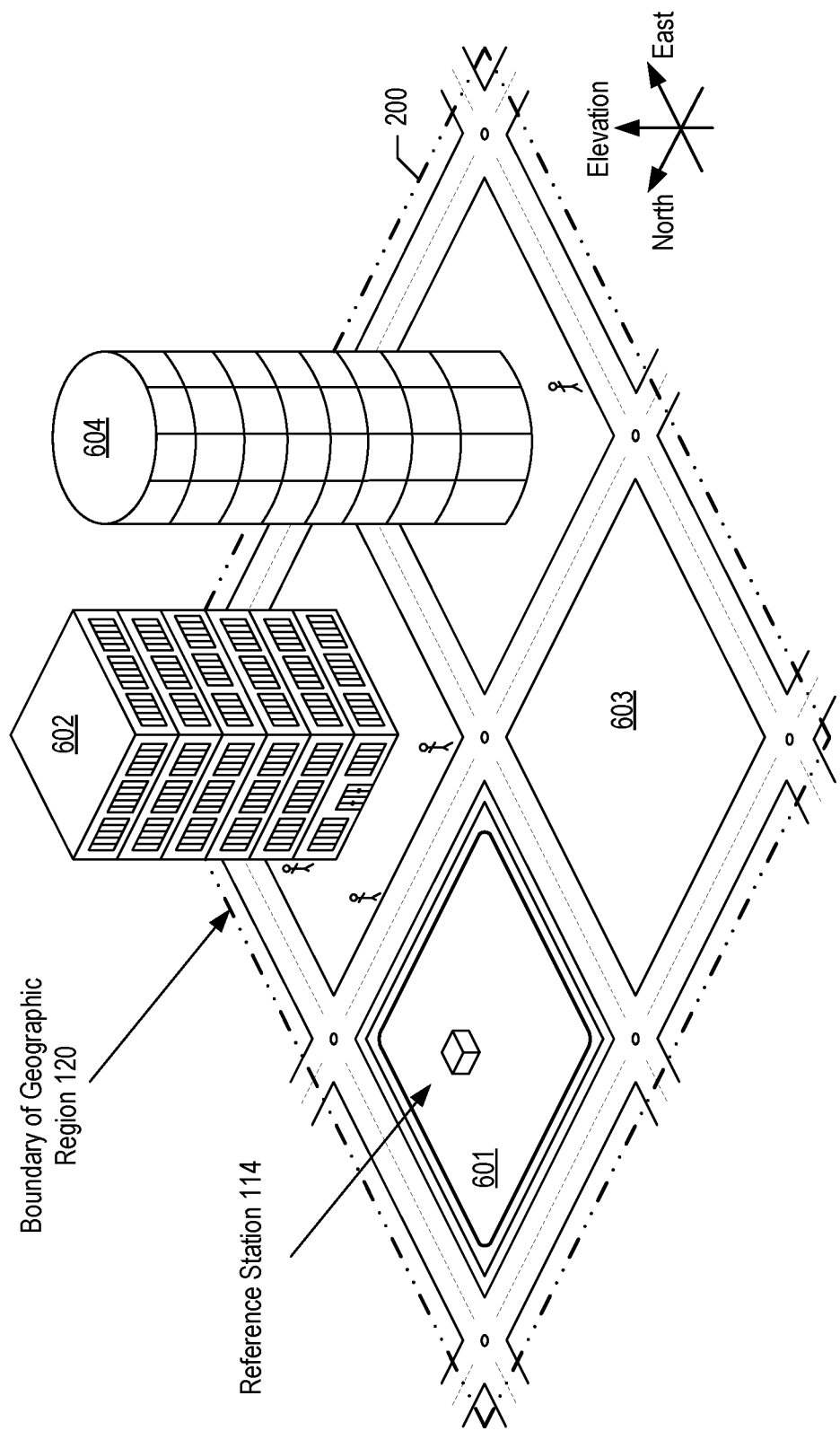
FIG. 6 depicts an isometric drawing of geographic region 120 in accordance with the illustrative embodiment of the present invention.

As part of operation 501, geographic region 120 is delimited and surveyed. FIG. 6 depicts a detailed map that is made of geographic region 120, which spans approximately four city blocks and comprises, among other elements, park 601, boxy building 602, empty lot 603, cylindrical building 604, and reference station 114. It will be clear to those skilled in the art, after reading this disclosure, how to make and use alternative embodiments of the present invention that comprise any area, any geographic features, and any number, size, height, and shape of structures such as buildings.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
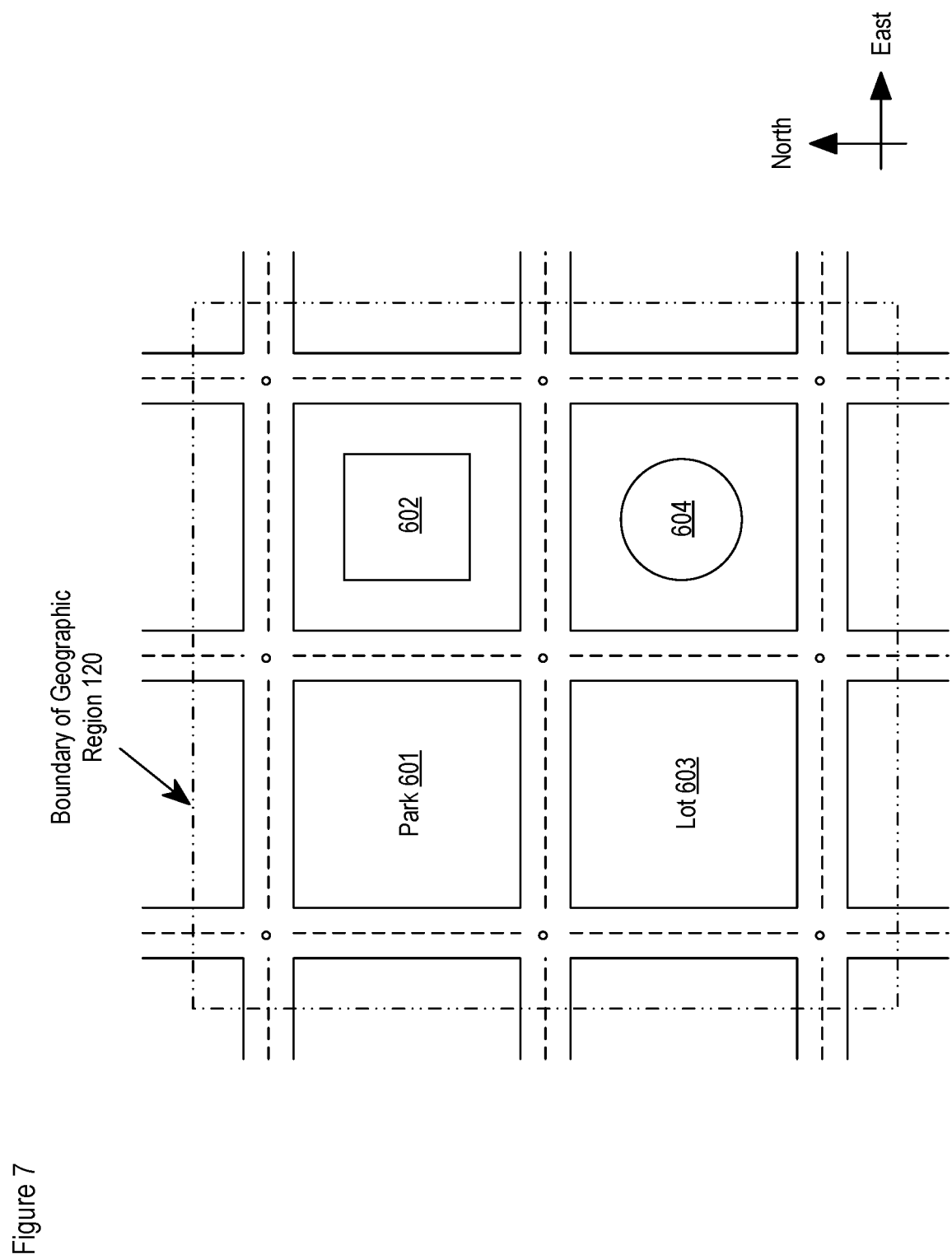
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of operation 501, a detailed map of the ground level of geographic region is made in well-known fashion, and as shown in FIG. 7.

As part of operation 501, grid 800 is overlaid onto geographic region 120 as shown in FIG. 8. Grid 800 is a 10-by-10 grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid squares, it will be clear to those skilled in the art how to make and use alternative embodiments of the present invention that comprise any number of possible lateral locations with any shape. See for example and without limitation, U.S. Pat. No. 7,753,278, which is incorporated by reference.

At any instant, the three-dimensional location of wireless terminal 101 can be described by a combination of a lateral location and an elevation. Although it is not improbable for wireless terminal 101 to be at any lateral location in geographic region 120 and it is not improbable for wireless terminal 101 to be at any elevation (up to 1140 meters) above geographic region 120, it is improbable for wireless terminal 101 to be at some combinations of those lateral locations and elevations. For example, it is not improbable for wireless terminal 101 to be at a lateral location in park 601 and to have an elevation of 1001 meters (i.e., be at or near ground level). It is, however, improbable for wireless terminal 101 to be at a lateral location in park 601 and to have an elevation of 1060 meters.

Therefore, as part of operation 501, each improbable combination of lateral locations and elevations for wireless terminal 101 in geographic region is determined, indexed by elevation, and stored in the GIS database. Each improbable combination of lateral locations and elevation for wireless terminal 101 can be determined by referencing the three-dimensional survey of geographic region 120, which is depicted in FIG. 9.

Figure 9:
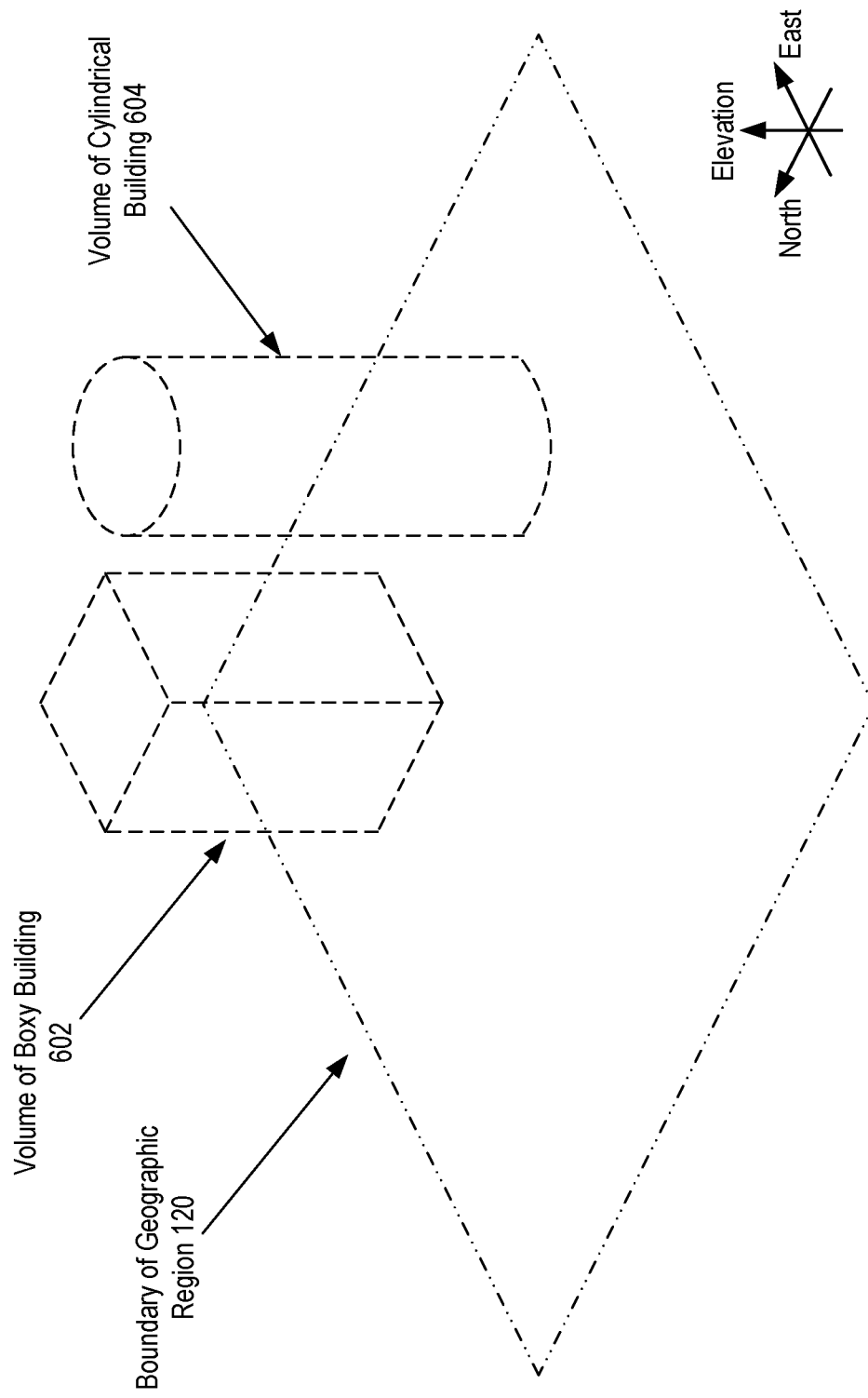
FIG. 9 depicts a three-dimensional survey of geographic region 120.

From the survey (as depicted in FIGS. 8 and 9), it can be seen that when wireless terminal 101 is at ground level (e.g., under an elevation of 1003 meters, etc.), it is not improbable for wireless terminal 101 to be at any lateral location in geographic region 120.

In contrast, when wireless terminal 101 is at an elevation above ground level (e.g., above an elevation of 1003 meters, etc.) and below the rooftop of building 602 (1128 meters), it is improbable for wireless terminal 101 to be at any lateral location that is outside of either boxy building 602 or cylindrical building 604, given the boundaries of the buildings. Therefore, when wireless terminal 101 is in this range of elevations, the plurality of lateral locations of wireless terminal 101 that are not improbable include the following coordinates referenced in FIGS. 8: (6,2), (6,3), (6,5), (6,6), (6,7), (7,2), (7,3), (7,5), (7,6), and (7,7).

When wireless terminal 101 is at an elevation above the rooftop of building 602 (1128 meters) and below the rooftop of building 604 (1140 meters), it is improbable for wireless terminal 101 to be at any lateral location that is outside of cylindrical building 604. Therefore, when wireless terminal 101 is in this range of elevations, the plurality of lateral locations of wireless terminal 101 that are not improbable include the following coordinates referenced in FIGS. 8: (6,2), (6,3), (7,2), and (7,3).

This information is stored in the GIS database in memory 303 as shown in Table 1.

TABLE 1

Possible Lateral Locations of Wireless Terminal 101 That Are Not Improbable Given The Elevation of Wireless Terminal 101

| Elevation of Wireless Terminal 101 | Possible Lateral Locations of Wireless Terminal 101 That Are Not Improbable |
|---|---|
| 1000 to 1003 meters | All 100 Grid Squares |
| 1003 to 1128 meters | (6, 2), (6, 3), (6, 5), (6, 6), (6, 7), (7, 2), (7, 3), (7, 5), (7, 6), (7, 7) |
| 1028 to 1140 meters | (6, 2), (6, 3), (7, 2), (7, 3) |

As described above, buildings 602 and 604 are represented with coordinates. As those who are skilled in the art will appreciate after reading this specification, in some embodiments of the present invention buildings 602 and 604, and objects in general, can be represented in a different way, such as by using a vector-based approach. For example and without limitation, one or more of the buildings in a geographic area can be described by a polygon shape of a building footprint, or rooftop, and the height of the building. Furthermore, any comparisons of distance can be made based on the polygon shape and/or polygon height stored, versus the coordinates stored.

At operation 503, the location-trait database is constructed and stored into memory 303 of location engine 113. As part of operation 505, the identity—and location-dependent traits for—each radio signal that a wireless terminal (e.g., terminal 101, terminal 102, etc.) is expected to be able to receive from cellular base stations 103-1, 103-2, and 103-3, Wi-Fi base stations 104-1 and 104-2, for each possible lateral location of the wireless terminal, is determined in well-known fashion.

As part of operation 503, the identity of—and location-dependent traits for—each radio signal that each of cellular base stations 103-1, 103-2, and 103-3, Wi-Fi base stations 104-1 and 104-2 is expected to be able to receive from a wireless terminal, for each possible lateral location of the wireless terminal, is determined in well-known fashion.

It will be clear to those skilled in the art how to accomplish operation 503, and in accordance with the illustrative embodiment, this is accomplished through a combination of empirical data gathering (e.g., drive testing, crowd sourcing, etc.) and radio-frequency propagation modeling. See for example and without limitation, U.S. Patent Application Publications 2008/0077356, 2008/0077472, and 2008/0077516, which are incorporated by reference.

At operation 505, the stack-effect database is initialized and stored into memory 303 of location engine 113. As part of operation 503, a stack-effect compensation model is generated for each grid square in geographic region 120 and for one or more height levels within each grid square that coincides with a building. In accordance with the illustrative embodiment, one or more stack-effect compensation model parameters are associated with height levels within a building.

In accordance with the illustrative embodiment, the stack-effect compensation model comprises a height parameter $H_N$. This parameter represents a height of an uncompensated estimate of elevation above a "neutral pressure plane" (NPP), also known as a "neutral pressure level," within a building or within a particular vertical segment of the building. The usage of $H_N$ is described below and in operation 1301.

In some alternative embodiments of the present invention, the stored parameter can represent the height of NNP that is associated with the particular uncompensated estimate. For such embodiments, it will be clear to those skilled in the art, after reading this specification, how to make and use embodiments of the present invention in which a refined estimate of elevation of wireless terminal 101 is based on the height of the NPP itself.

In regard to initializing the compensation model, the value of $H_N$ can be initialized to zero if it is assumed that there is zero pressure difference between the outside air and the air inside the building—that is, the building is continuously leaky along its entire height. As those who are skilled in the art will appreciate after reading this specification, there can be more than one NPP associated with a particular building; thus, the value for $H_N$ at each elevation can be based on the dominant NPP for that elevation or extent of elevations.

In accordance with the illustrative embodiment, the value of $H_N$ is initially set to zero wherever its actual value is unknown and then updated in accordance with the subsequent operations that are performed as described elsewhere herein.

For additional details on initializing and constructing a stack-effect compensation model, see for example and without limitation U.S. Pat. No. 9,237,423, which is incorporated by reference herein. In any event, it will be clear to those who are skilled in the art after reading this specification how to initialize and construct a stack-effect compensation model.

Figure 10:
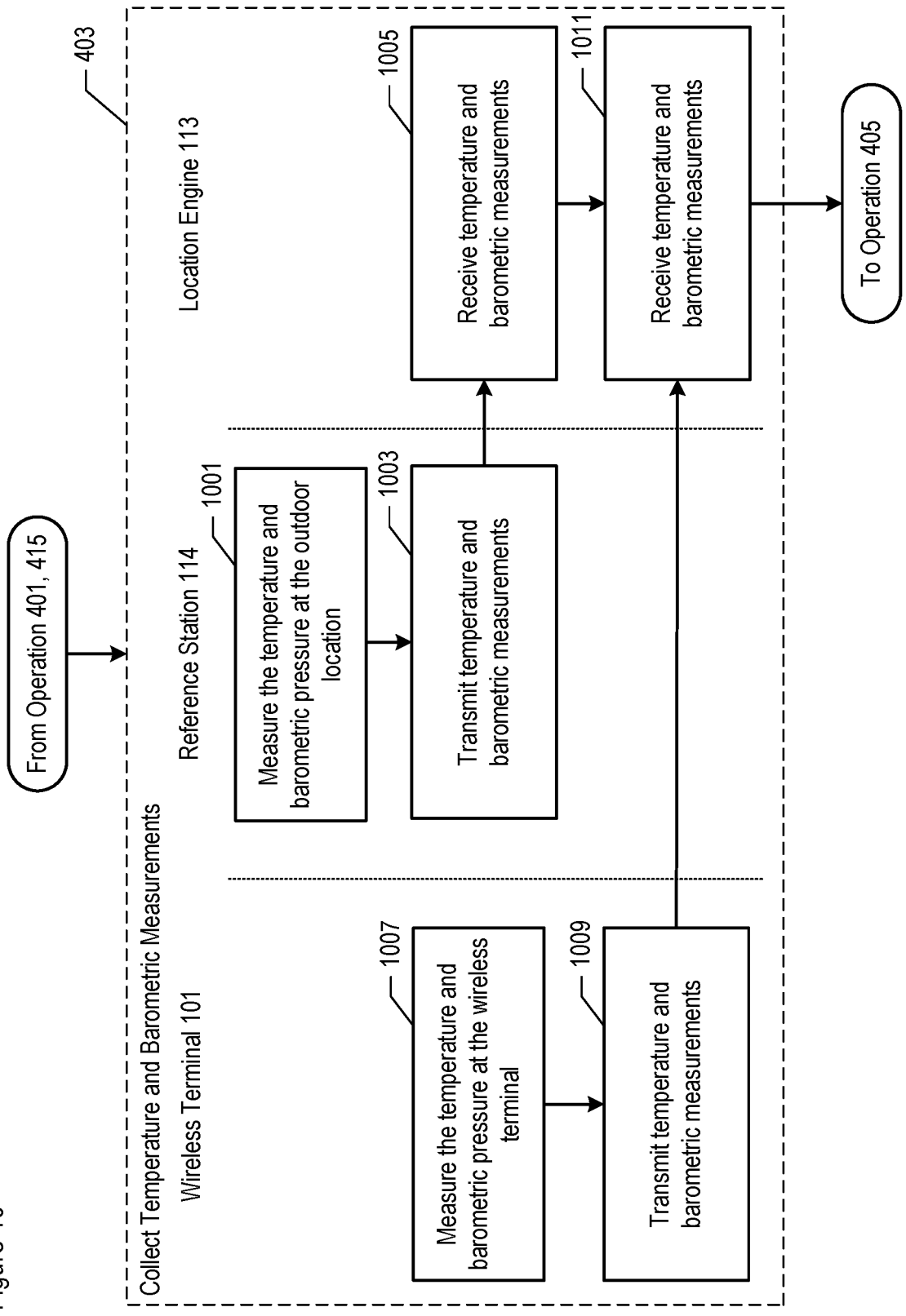
FIG. 10 depicts a flowchart of the salient processes performed in accordance with operation 403 of method 400.

Operation 403: Collect Temperature and Barometric Measurements—FIG. 10 depicts a flowchart of the salient processes performed in accordance with operation 403. For illustrative purposes, wireless terminal 101 is depicted as performing the various operations in FIG. 10 and also in FIG. 11. It will be clear to those skilled in the art after reading this specification, however, how to make and use embodiments of the present invention in which other wireless terminals (e.g., wireless terminal 102, etc.) perform at least some of the operations that wireless terminal 101 is depicted as performing, in addition to or instead of wireless terminal 101.

In accordance with operation 1001, reference station 114 measures samples of temperature, $T_W$, and barometric pressure, $P_W$, in its vicinity. In some embodiments of the present invention, each sample represents one measurement of temperature or of barometric pressure, while in some other embodiments each sample comprises more than one measurement of temperature or of barometric pressure.

In accordance with operation 1003, reference station 114 transmits a measurement of temperature, $T_W$, (i.e., provides a measurement of temperature at an outdoor location) and atmospheric pressure, $P_W$, (i.e., provides a measurement of barometric pressure at an outdoor location) to location engine 113. In accordance with the illustrative embodiment, operation 1003 is performed every 10 minutes, but it will be clear to those skilled in the art how to make and use alternative embodiments of the present invention that transmit the measurements at other times.

In accordance with operation 1005, location engine 113 receives the measurement of temperature, $T_W$, and a measurement of atmospheric pressure, $P_W$, transmitted in accordance with operation 1003.

In accordance with operation 1007, wireless terminal 101 measures samples of temperature, $T_T$, and barometric pressure, $P_T$, in its vicinity by using barometer 205. In some embodiments of the present invention, each sample represents one measurement of temperature or of barometric pressure, while in some other embodiments each sample comprises more than one measurement of temperature or of barometric pressure. In accordance with the illustrative embodiment, a measurement of temperature or of barometric pressure is taken once per second, but it will be clear to those skilled in the art how to make and use alternative embodiments of the present invention that take the measurements at a different rate (e.g., 5 per second, 10 per second, etc.).

In accordance with operation 1009, wireless terminal 101 transmits a measurement of temperature, $T_T$, and a measurement of atmospheric pressure, $P_T$, to location engine 113. In accordance with the illustrative embodiment, operation 1009 is performed every 5 seconds, but it will be clear to those skilled in the art how to make and use alternative embodiments of the present invention that transmit the measurements at other times.

In accordance with operation 1011, location engine 113 receives the temperature and atmospheric measurements transmitted in accordance with operation 1009. In some embodiments of the present invention, location engine 113 combines the values of multiple pressure samples (e.g., by calculating a median, etc.) in order to reduce measurement noise.

Operations 1001 through 1011 are performed continuously, concurrently, and asynchronously, in accordance with the illustrative embodiment.

Figure 11:
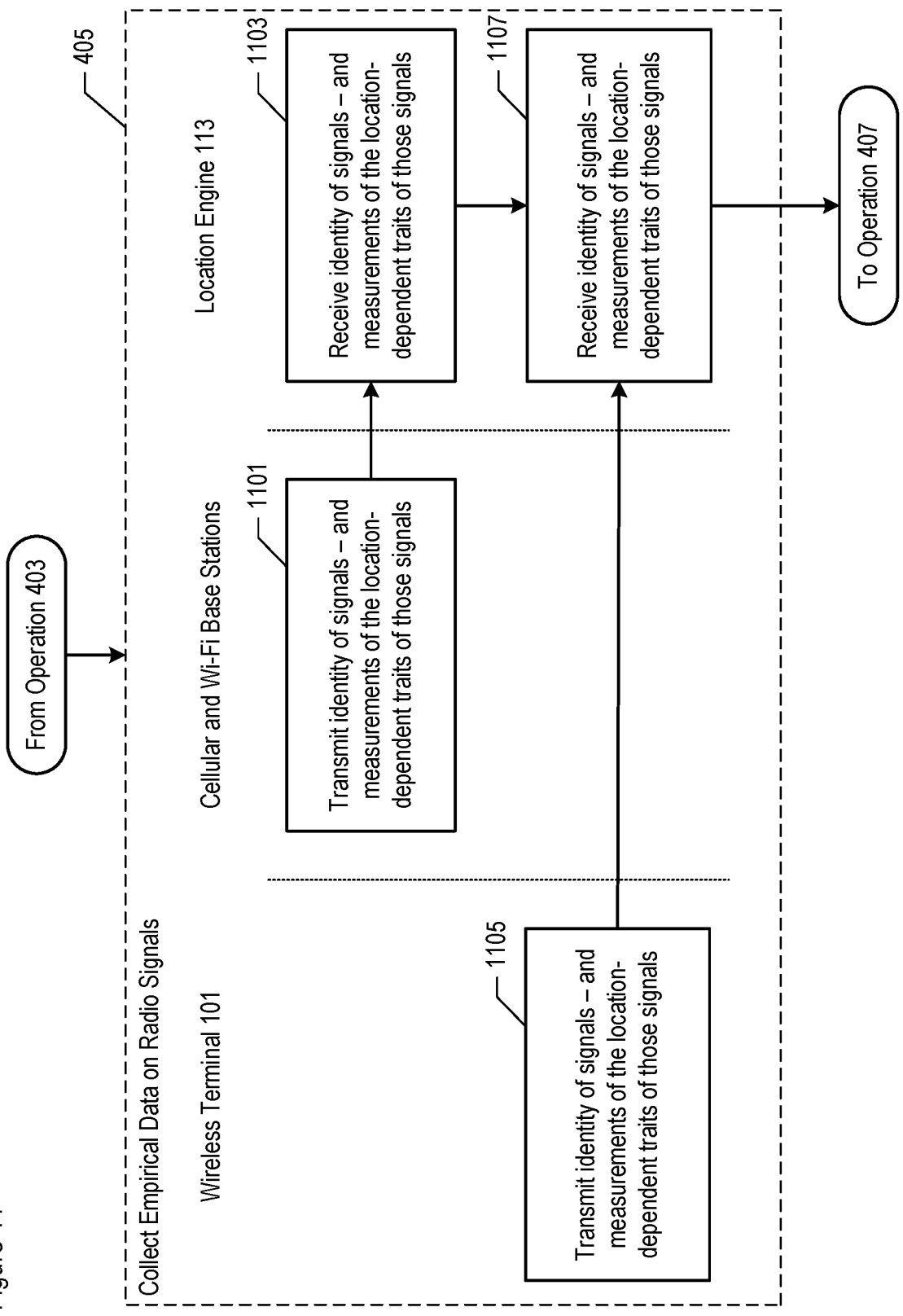
FIG. 11 depicts a flowchart of the salient processes performed in accordance with operation 405 of method 400.

Operation 405: Collect Empirical Data on Radio Signals—FIG. 11 depicts a flowchart of the salient processes performed in accordance with operation 405.

At operation 1101, each of cellular base stations 103-1, 103-2, and 103-3 and Wi-Fi base stations 104-1 and 104-2 transmits the identity of each signal it has received from wireless terminal 101 and the measurements of the location-dependent traits of those signals—though not necessarily simultaneously or synchronously with one another. In accordance with the illustrative embodiment, operation 1101 is performed every 20 milliseconds, but it will be clear to those skilled in the art how to make and use alternative embodiments of the present invention that transmit the measurements at other times.

At operation 1103, location engine 113 receives the identities and measurements transmitted at operation 1101.

At operation 1105, wireless terminal 101 transmits the identity of each signal it receives from cellular base stations 103-1, 103-2, and 103-3 and Wi-Fi base stations 104-1 and 104-2 and the measurements of the location-dependent traits of those signals. In accordance with the illustrative embodiment, operation 1105 is performed every 20 milliseconds, but it will be clear to those skilled in the art how to make and use alternative embodiments of the present invention that transmit the measurements at other times.

At operation 1107, location engine 113 receives the identities and measurements transmitted at operation 1105.

Operations 1101 through 1107 are performed continuously, concurrently, and asynchronously, in accordance with the illustrative embodiment.

Figure 12:
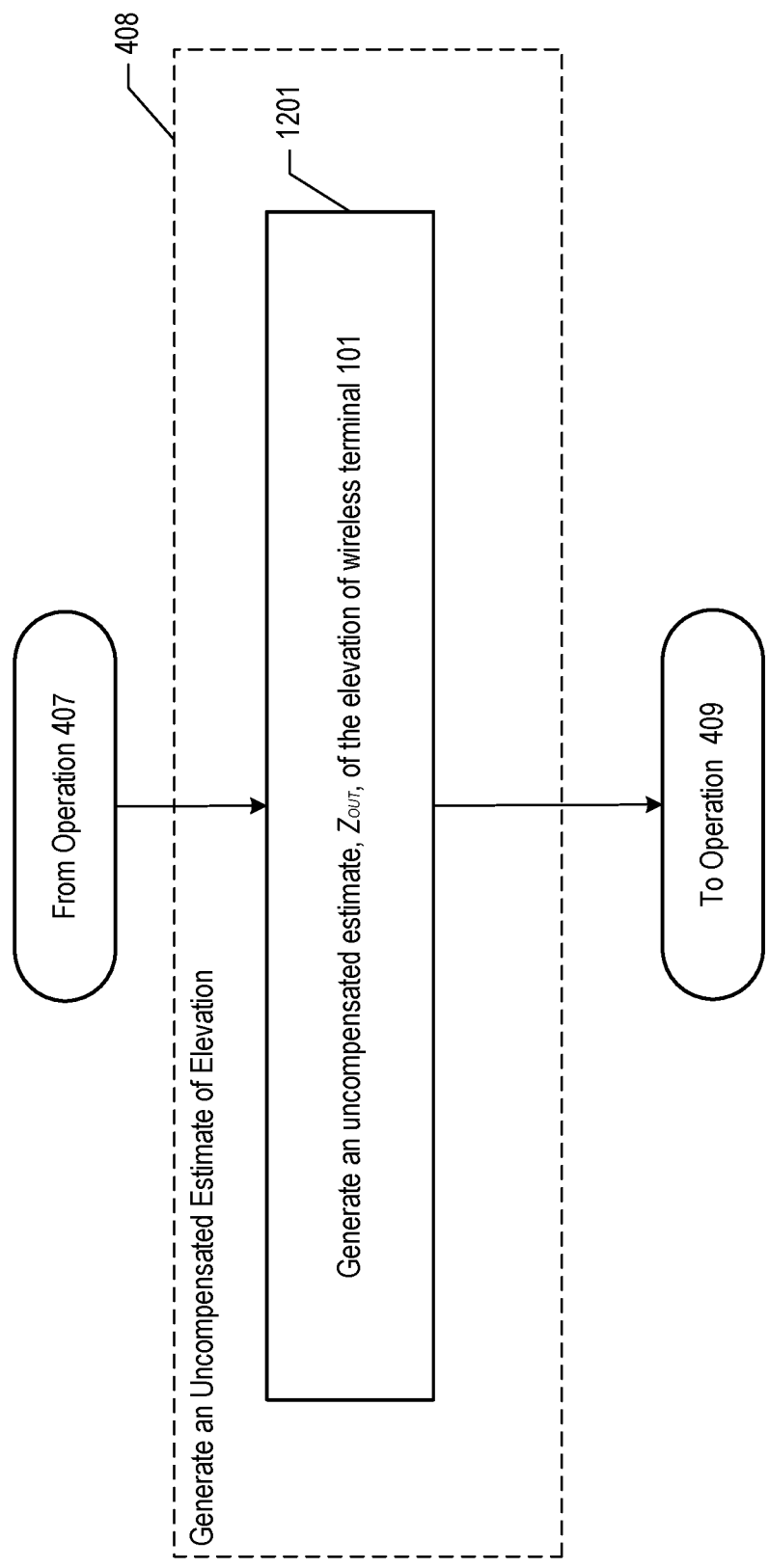
FIG. 12 depicts a flowchart of the salient processes performed in accordance with operation 408 of method 400

Operation 408: Generate an Uncompensated Estimate of Elevation—FIG. 12 depicts a flowchart of the salient processes performed in accordance with operation 408.

At operation 1201, location engine 113 generates an uncompensated estimate of the elevation of wireless terminal 101 that is based on pressure data and outdoor scale height, but not on indoor temperature data. The uncompensated estimate, $Z_{OUT}$, is based on:

$$Z_{OUT} = -H_{OUT} \cdot \ln\left(\frac{P_T}{P_W}\right) + Z_W \quad \text{(Eq. 2)}$$

wherein:
- $H_{OUT}$ is the outdoor scale height of the atmosphere, which is the elevation at which the atmospheric pressure has decreased to $e^{-1}$ times its value at mean sea level (e.g., approximately 8400 meters) and is based on outdoor temperature, $T_W$.
- $P_T$ is the relevant measurement of barometric pressure received from wireless terminal 101,
- $P_W$ is the measurement of atmospheric pressure at reference station 114 (in Pascals), and
- $Z_W$ is the elevation of reference station 114 (1000 meters in the illustrative embodiment).

In some embodiments of the present invention, measurements $P_T$ and $P_W$ are used that coincide in time with $T_W$ and $T_T$ as closely as possible. In accordance with the illustrative embodiment, location engine 113 has access to multiple reference stations, such as reference station 114, and uses a pressure measurement $P_W$ from the reference station that is the closest in distance to the lateral location estimated in accordance with operation 407. In some embodiments of the present invention, location engine 113 uses measurements from the reference station that is most relevant to the lateral location estimated in accordance with operation 407, in some way other than closest in distance.

As those who are skilled in the art will appreciate after reading this specification, in some alternative embodiments $Z_{OUT}$ can be determined using a different equation than that described above. In some embodiments of the present invention, $P_T$ can be adjusted by an estimate of measurement bias of barometric pressure at wireless terminal 101 or by other environmental factors, prior to calculating $Z_{OUT}$. Additionally, in some embodiments of the present invention $Z_{OUT}$ can also be based on the lateral location of wireless terminal 101 estimated in accordance with operation 407.

Figure 13:
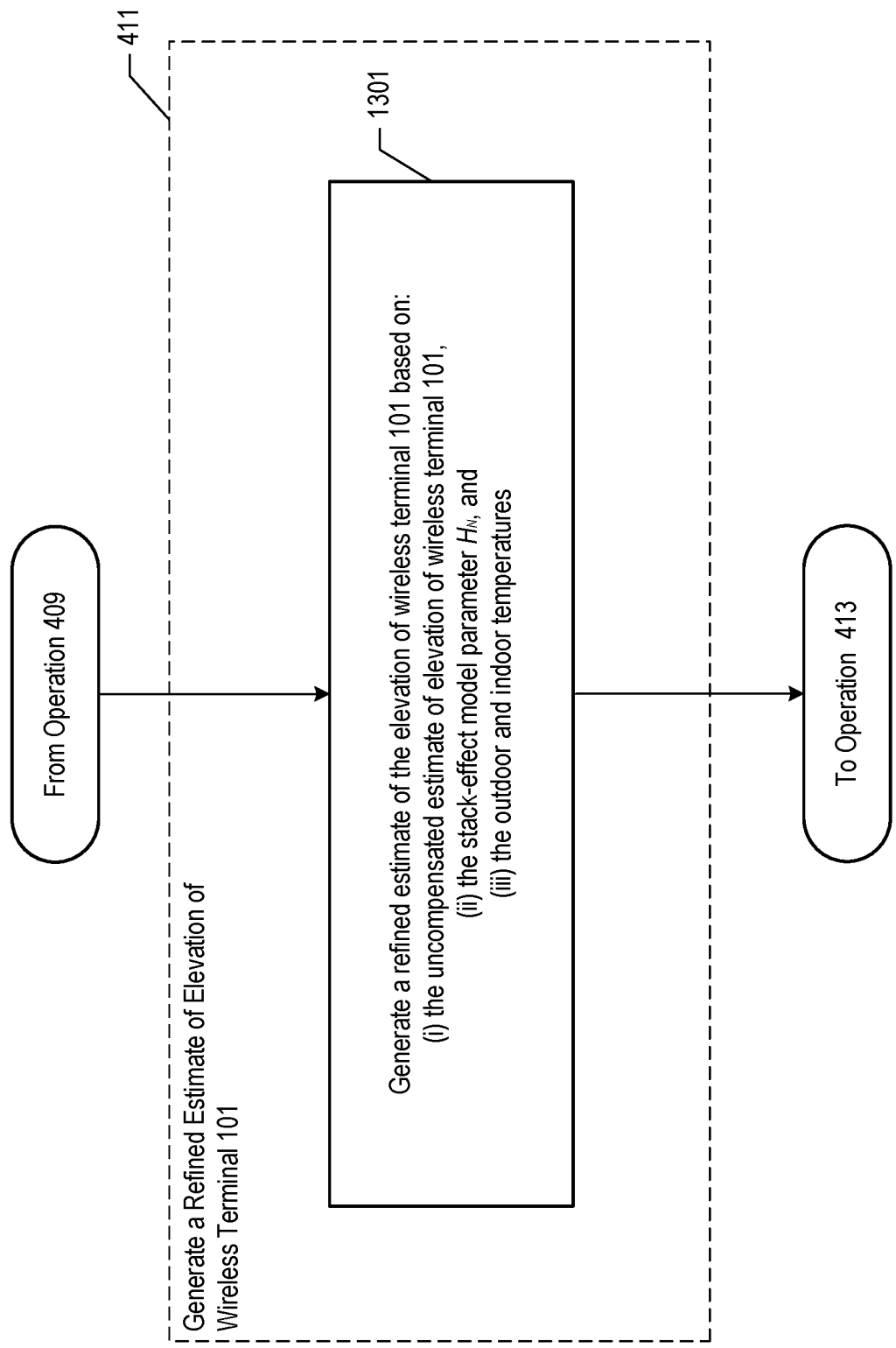
FIG. 13 depicts a flowchart of the salient processes performed in accordance with operation 411 of method 400

Operation 411: Estimate the Elevation of Wireless Terminal 101—FIG. 13 depicts a flowchart of the salient processes performed in accordance with operation 411.

At operation 1301 location engine 113 generates a refined estimate of the elevation of wireless terminal 101, $Z_T$, based on:

$$Z_T = Z_{OUT} - H_N \cdot \frac{(T_W - T_T)}{T_T} \quad \text{(Eq. 3)}$$

wherein:
- $Z_{OUT}$ is the uncompensated estimate of elevation of wireless terminal 101 generated in accordance with operation 408,
- $H_N$ is the stack-effect compensation model parameter selected in accordance with operation 409,
- $T_T$ is the relevant measurement of indoor temperature received from wireless terminal 101, and
- $T_W$ is the relevant measurement of outdoor temperature received from reference station 114.

In some embodiments, measurements $T_W$ and $T_T$ are used that coincide in time with each other and with $P_W$ and $P_T$ as closely as possible. In some embodiments of the present invention, such as when the wireless terminal does not provide $T_T$, location engine 113 can obtain an indoor temperature value via other means (e.g., via an indoor building sensor or sensors, etc.) or can use an assumed indoor temperature value (e.g., 68 degrees F., 20 degrees C., etc.). In accordance with the illustrative embodiment, location engine 113 has access to multiple reference stations, such as reference station 114, and uses a temperature measurement $T_W$ from the reference station that is the closest in distance to the lateral location estimated in accordance with operation 407. In some embodiments of the present invention, location engine 113 uses measurements from the reference station that is most relevant to the lateral location estimated in accordance with operation 407, in some way other than closest in distance.

As those who are skilled in the art will appreciate after reading this specification, in some alternative embodiments $Z_T$ can be determined using a different equation than that described above.

Location engine 113 stores the value of $Z_T$, as well as the corresponding values of $T_W$ and $T_T$, in memory 303 for use in operation 413 as described below.

Figure 14:
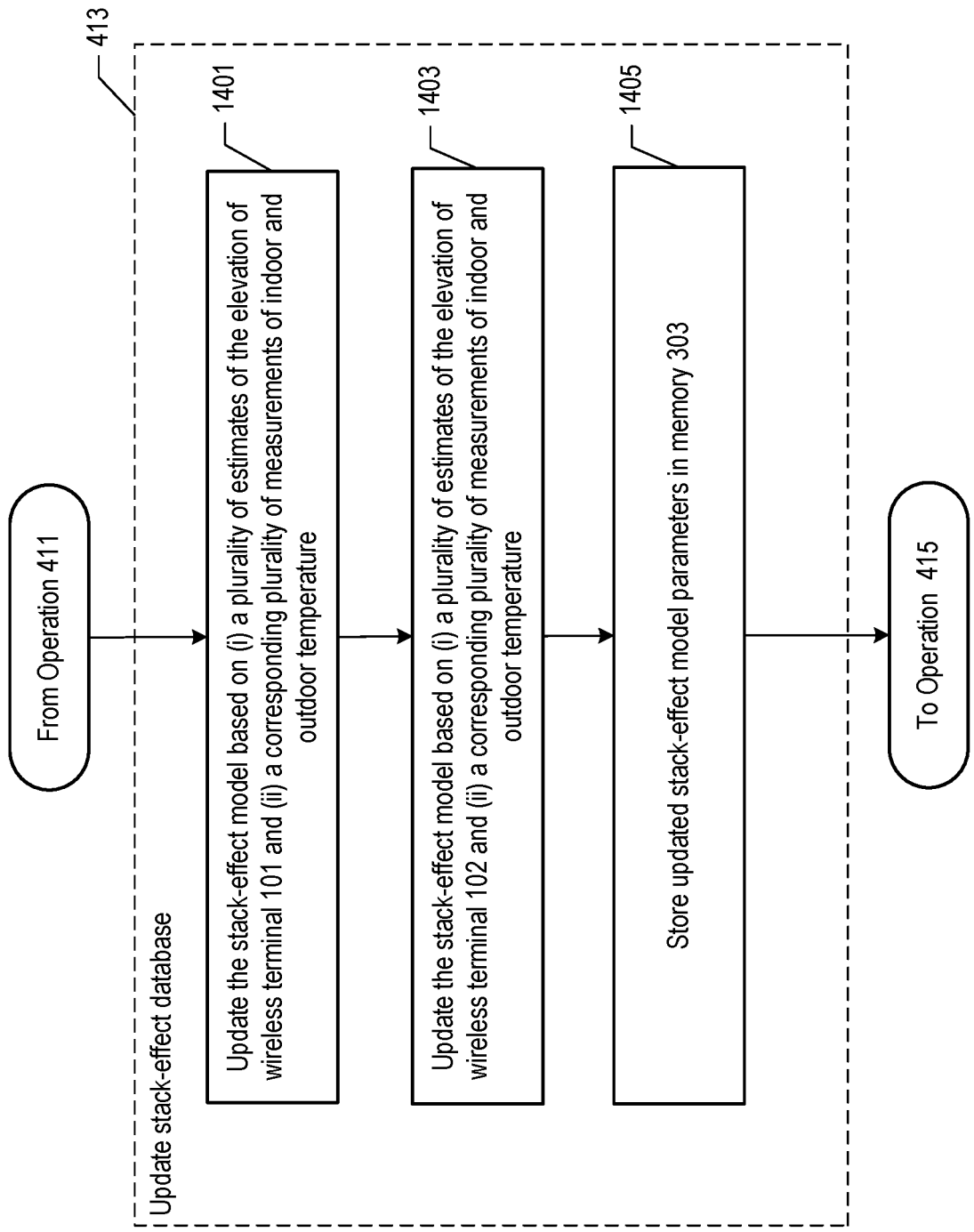
FIG. 14 depicts a flowchart of the salient processes performed in accordance with operation 413 of method 400.

Operation 413: Update the Stack-Effect Database—FIG. 14 depicts a flowchart of the salient processes performed in accordance with operation 413.

In accordance with operation 1401, location engine 113 updates the stack-effect database (e.g., periodically, sporadically, on-demand, etc.), which was initialized in operation

503, based on observing the variation in the estimated elevation, $Z_T$, of wireless terminal 101 over multiple estimates. Because a sufficiently accurate stack-effect model has not necessarily been established at this point in time in the processing, a variation in the estimated elevation is expected. The variation is attributed to, at least in part, on a corresponding variation of the difference between indoor and outdoor temperatures (i.e., $T_T$ versus $T_W$).

By observing variations in $Z_T$ over a sufficient observation window of time, and by knowing the relationship of the variation to other parameters as described below, location engine 113 can estimate the elevation at which there is no error that can be attributed to stack effect. This elevation corresponds to a pressure reading, either actual or derived, corresponding in time to indoor and outdoor pressure measurements that are equal to each other. Once this elevation with no stack-effect error is estimated, location engine 113 can determine the distance of wireless terminal 101 to the neutral pressure plane (NPP), as described below, and update the related parameter in the stack-effect database accordingly.

A sufficient observation window can be based, at least in part, on the presence of a variation in the outdoor temperature, $T_W$, and/or the indoor temperature, $T_T$, the numeric difference between outdoor and indoor temperatures, and how far the observing wireless terminal is from the NPP. The window can amount to observations at multiple times within a single day, at the same time across multiple days, at multiple times across multiple days, and so on.

An assumption can be made that wireless terminal 101, when it is present in the building, is at a given height (e.g., on the same building floor, etc.) at least most of its time. Although this assumption simplifies the subsequent calculations in that it eliminates a variable, it is not a requirement that this assumption be made. As those who are skilled in the art will appreciate after reading this specification, embodiments of the present invention can be made and used that do not require an assumption about wireless terminal 101 being at a steady building height. For example, location engine 113 can track (e.g., over a period of days, etc.) the wireless access point or points (e.g., WiFi, etc.) that wireless terminal 101 attaches to; the wireless terminal attaching repeatedly to the same access point is probative of the wireless terminal repeatedly being at the same building floor. Conversely, the wireless terminal attaching to different access points known to be on different floors is probative of the wireless terminal not consistently visiting the same floor. In using a wireless access point in the aforementioned way, it is not necessary to know the actual elevation of the access point; it is only necessary that location engine 113 track the identities of the wireless access points to which wireless terminal 101 attaches.

In some embodiments of the present invention, location engine 113 can improve its estimation of stack effect by ascertaining the elevation of an assisting wireless access point ahead of time, which the location engine can determine itself. For example, location engine 113 can estimate the wireless access point's elevation on the days that stack effect is not significant, such as when the indoor and outdoor temperatures are the same, or at least within a negligible range of each other, thereby eliminating an unknown variable.

The error that can be attributed to stack effect, $Z_{ERR}$, in estimating the elevation of a wireless terminal is the difference between the uncompensated estimate of elevation of the wireless terminal, $Z_{OUT}$, and the estimate accounting for stack effect, $Z_T$. In at least some embodiments of the present invention, $Z_{ERR}$ can be described by:

$$Z_{ERR} = H_N \cdot \frac{(T_W - T_T)}{T_T} \qquad \text{(Eq. 4)}$$

wherein:
$H_N$ is the height of the wireless terminal above the neutral pressure plane and might be initially unknown,
$T_T$ is the measurement of temperature at the wireless terminal (in Kelvin), and
$T_W$ is the measurement of temperature at reference station 114 (in Kelvin).
Equation 4 can be simplified to:

$$Z_{ERR} = C \cdot H_N \cdot (T_W - T_T) \qquad \text{(Eq. 5)}$$

wherein:
C is based on $1/T_T$ and is a constant equal to 0.0034482759 assuming an indoor temperature of 290 degrees K.

By observing the variation of the height estimation $Z_T$ of wireless terminal 101 and knowing that $Z_{ERR}$ is the component of $Z_T$ that varies (i.e., because of temperature changes), location engine 113 is able to determine how far the actual elevation of the wireless terminal is from the neutral pressure plane, thereby solving for $H_N$ that corresponds to $Z_{OUT}$ (i.e., elevation uncompensated for indoor temperature) of the wireless terminal. The sign of the difference between the actual elevation and the height of the NPP can be positive or negative depending on whether wireless terminal 101 elevation is above or below that of the NPP, respectively. $H_N$ is defined in terms of height in relation to the NPP. Location engine 113 can then store the value of $H_N$ in the stack-effect model database, as described below and in accordance with operation 1405.

As a result of the aforementioned processing, location engine 113 is also able to derive the height of the segment's NPP, which is the neutral pressure plane affecting pressure measurements taken by wireless terminal 101, as well as other wireless terminals operating within the same segment of the building (i.e., the segment dominated by the same NPP).

In accordance with operation 1403, location engine 113 also determines $Z_{ERR}$ for one or more additional wireless terminals that are within the same building as wireless terminal 101, such as wireless terminal 102, in a similar manner as that described above for wireless terminal 101. By solving for $H_N$ for each additional wireless terminal, location engine 113 is able to characterize additional aspects of a stack-effect model within the building. For example and without limitation, location engine 113 can use the information from two wireless terminals to determine whether both terminals are within the same building segment or are in separate building segments. If both wireless terminals are in the same segment, the additional information can be used to refine the estimate of the NPP height. Additionally, there is no constraint that the stack effect model for a building must be constant or that it does not vary with seasons, time of day, or other factors.

In some embodiments of the present invention, the elevations of one or more wireless terminals are ascertained independently of barometric pressure measurements. For example, the elevations of one or more wireless access points within a building are already known; in which case, location engine 113 uses the known elevation of an access point to infer the elevation of a wireless terminal that is reporting the identity of said access point. In turn, measurements reported from such wireless terminals can then be used to determine and/or refine a height in relation to a neutral pressure plane (i.e., of an elevation uncompensated for indoor temperature) and/or the height of the neutral pressure plane itself.

In some embodiments of the present invention, an estimate of location of a wireless terminal classifies the wireless terminal as being inside or outside the building and uses the classification to infer specific stack effect characteristics about the building, in order to update neutral pressure plane information. In particular, the indoor-outdoor classification can be used to infer the stack effect characteristics by confirming the indoor-versus-outdoor pressure differential for that elevation.

Figure 15B:
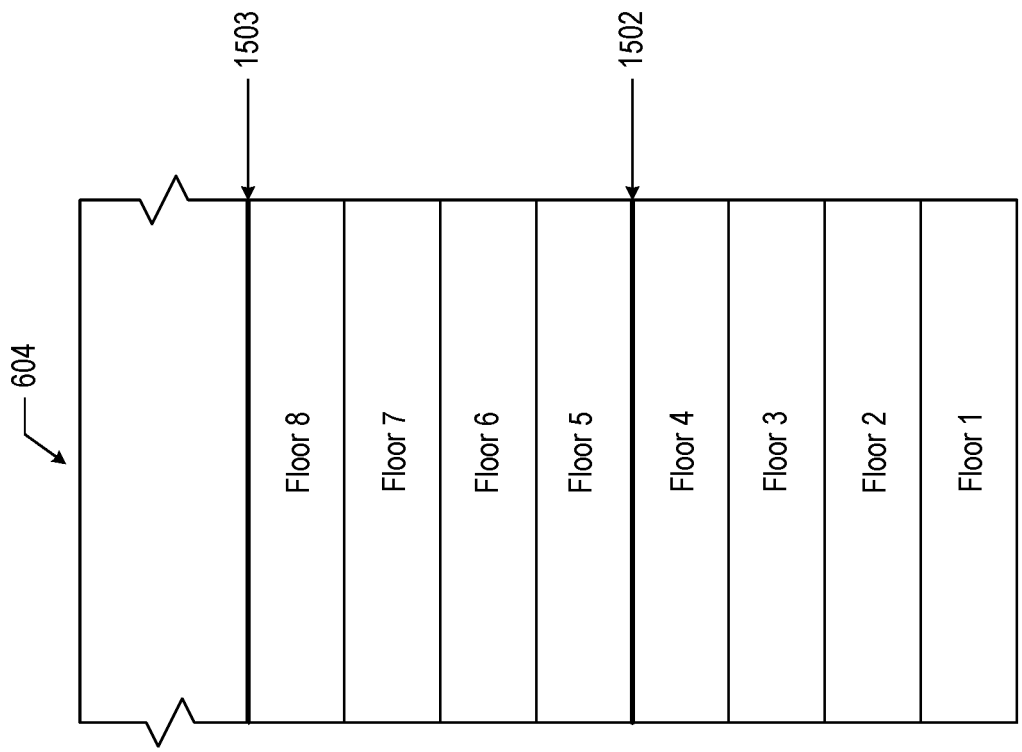
FIGS. 15A and 15B depict neutral pressure planes in buildings 602 and 604, respectively.
Figure 15A:
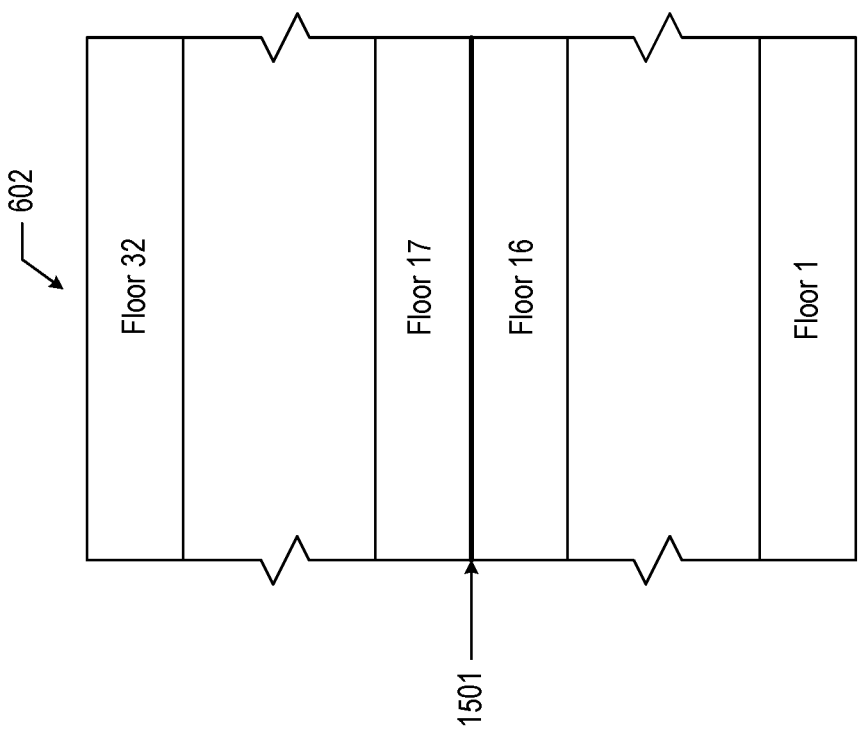

Location engine 113 can also determine stack effect models in multiple buildings and, as described earlier, selects which model to use based on the wireless terminal's lateral location (i.e., the location that coincides with a particular building). As depicted in FIG. 15A, and in accordance with the illustrative embodiment, location engine 113 determines the height of the neutral pressure plane 1501 in boxy building 602 to be at one-half of the height of the building or at 64 meters, wherein each floor is 4 meters in height as depicted. Meanwhile, as depicted in FIG. 15B, location engine 113 determines the heights of the multiple pressure planes in cylindrical building 604, including neutral pressure planes 1502 and 1503, to be 16 meters apart from one another, which is a result of the building having been segmented every four floors in its construction (e.g., for fire safety or ventilation purposes, etc.).

In accordance with operation 1405, location engine 113 updates one or more stack-effect parameters (e.g., the value of $H_N$, etc.) in the stack-effect database in memory 303, based on operations 1401 and 1403. The updated parameters can be used, for example, in a subsequent iteration of operation 1301 to generate a refined estimate of the elevation of a wireless terminal, $Z_T$.

The stack-effect compensation model can additionally utilize ground level pressure differentials versus outdoor pressure measured by the same handset, by other crowd-sourced handsets, or against an exterior reference station for rapid stack effect calibration (i.e., within a time interval in which the outdoor pressure does not change significantly) and to predict the neutral pressure plane location in a building. For instance, a handset can be quickly taken to the ground floor lobby of each high-rise building to assess the indoor-versus-outdoor pressure differential and temperature affecting the neutral pressure plane. This differential is related to the neutral pressure plane location in the building due to stack effect, wherein the neutral plane can be estimated based upon these measurements taken in rapid succession and at different elevations from the neutral pressure plane.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating elevation of one or more wireless terminals, the method comprising:
   receiving, at a data processing system, a plurality of measurements of barometric pressure at a first wireless terminal that is within a structure;
   receiving, at the data processing system, a plurality of measurements of indoor temperature at the first wireless terminal;
   receiving, at the data processing system, a plurality of measurements of outdoor temperature at an outdoor location;
   tracking wireless access points to which the first wireless terminal attaches within the structure;
   generating a plurality of estimates of the elevation of the first wireless terminal based on the plurality of measurements of barometric pressure at the first wireless terminal, wherein the estimates of the elevation of the first wireless terminal are independent of the indoor temperature at the first wireless terminal;
   generating an estimate $H_N$ of a height of an uncompensated estimate of elevation in relation to a neutral pressure plane within the structure, wherein the estimate $H_N$ is based on:
      (i) the plurality of measurements of indoor temperature at the first wireless terminal,
      (ii) the plurality of measurements of outdoor temperature at the outdoor location,
      (iii) the plurality of estimates of the elevation of the first wireless terminal, and
      (iv) the tracking of the wireless access points; and
   generating an estimate of the elevation of a second wireless terminal that is within the structure based on:
      (i) a measurement of barometric pressure at the second wireless terminal, and
      (ii) the estimate $H_N$.

2. The method of claim 1 further comprising transmitting the estimate of the elevation of the second wireless terminal to a location-based application server.

3. The method of claim 1 further comprising:
   receiving, at the data processing system, a first measurement of barometric pressure at the outdoor location;
   wherein the generating of the plurality of estimates of the elevation of the first wireless terminal is further based on the first measurement of barometric pressure at the outdoor location.

4. The method of claim 1 further comprising:
   receiving, at the data processing system, at least one of i) a measurement of a location-dependent trait of a radio signal and ii) an identity of a radio signal as received by the second wireless terminal; and
   generating an estimate of the lateral location of the second wireless terminal based on the at least one of i) the measurement of a location-dependent trait of the radio signal and ii) the identity of the radio signal;
   wherein the estimate of the elevation of the second wireless terminal is further based on the estimate of the lateral location of the second wireless terminal.

5. The method of claim 1 further comprising:
   receiving, at a data processing system, a plurality of measurements of barometric pressure at a third wireless terminal that is within the structure;
   wherein the estimate $H_N$ is further based on the plurality of measurements of barometric pressure at the third wireless terminal.

6. The method of claim 5 further comprising:
   receiving, at a data processing system, plurality of measurements of indoor temperature at the third wireless terminal;
   wherein the estimate $H_N$ is further based on the plurality of measurements of indoor temperature at the third wireless terminal.

7. The method of claim 1, wherein the first wireless terminal attaching repeatedly to a particular wireless access point is probative of the first wireless terminal being repeatedly at a particular building floor within the structure, wherein the estimate $H_N$ is further based on the first wireless terminal being repeatedly at the particular building floor.

8. The method of claim 1, wherein the first wireless terminal attaching to different wireless points known to be at different building floors is probative of the first wireless terminal being at the different building floors within the structure, wherein the estimate $H_N$ is further based on the first wireless terminal being at the different building floors.

9. A method of estimating elevation of one or more wireless terminals, the method comprising:
  receiving, at a data processing system, a plurality of measurements of barometric pressure at a first wireless terminal that is within a structure;
  receiving, at the data processing system, a plurality of measurements of barometric pressure at a second wireless terminal that is within the structure;
  receiving, at the data processing system, a plurality of measurements of indoor temperature at the first wireless terminal;
  receiving, at the data processing system, a plurality of measurements of outdoor temperature at the outdoor location;
  tracking a first set of wireless access points to which the first wireless terminal attaches within the structure;
  generating a first plurality of estimates of the elevation of the first wireless terminal based on the plurality of measurements of barometric pressure at the first wireless terminal, wherein the estimates of the elevation of the first wireless terminal are independent of the indoor temperature at the first wireless terminal;
  generating a second plurality of estimates of the elevation of the second wireless terminal based on the plurality of measurements of barometric pressure at the second wireless terminal, wherein the estimates of the elevation of the second wireless terminal are independent of the indoor temperature at the second wireless terminal;
  generating an estimate $H_N$ of a height of an uncompensated estimate of elevation in relation to a neutral pressure plane within the structure, wherein the estimate $H_N$ is based on:
    (i) the plurality of measurements of indoor temperature at the first wireless terminal,
    (ii) the plurality of measurements of outdoor temperature at the outdoor location,
    (iii) the first plurality of estimates of the elevation of the first wireless terminal,
    (iv) the second plurality of estimates of the elevation of the second wireless terminal, and
    (v) the tracking of the first set of wireless access points; and
  generating an estimate of the elevation of a third wireless terminal that is within the structure based on:
    (i) a measurement of barometric pressure at the third wireless terminal, and
    (ii) the estimate $H_N$.

10. The method of claim 9 further comprising transmitting the estimate of the elevation of the third wireless terminal to a location-based application server.

11. The method of claim 9 further comprising:
  receiving, at the data processing system, a first measurement of barometric pressure at the outdoor location;
  wherein the generating of the plurality of estimates of the elevation of the first wireless terminal is further based on the first measurement of barometric pressure at the outdoor location.

12. The method of claim 9 further comprising:
  receiving, at the data processing system, at least one of i) a measurement of a location-dependent trait of a radio signal and ii) an identity of a radio signal as received by the third wireless terminal; and
  generating an estimate of the lateral location of the third wireless terminal based on the at least one of i) the measurement of a location-dependent trait of the radio signal and ii) the identity of the radio signal;
  wherein the estimate of the elevation of the third wireless terminal is further based on the estimate of the lateral location of the third wireless terminal.

13. The method of claim 9 further comprising:
  receiving, at a data processing system, a plurality of measurements of indoor temperature at the second wireless terminal;
  wherein the estimate $H_N$ is further based on the plurality of measurements of indoor temperature at the second wireless terminal.

14. The method of claim 9, wherein the first wireless terminal attaching repeatedly to a particular wireless access point is probative of the first wireless terminal being repeatedly at a particular building floor within the structure, wherein the estimate $H_N$ is further based on the first wireless terminal being repeatedly at the particular building floor.

15. The method of claim 9, wherein the first wireless terminal attaching to different wireless points known to be at different building floors is probative of the first wireless terminal being at the different building floors within the structure, wherein the estimate $H_N$ is further based on the first wireless terminal being at the different building floors.

16. The method of claim 9, further comprising tracking a second set of wireless access points to which the second wireless terminal attaches within the structure, wherein the estimate $H_N$ is further based on the tracking of the second set of wireless access points.

* * * * *